(12) United States Patent
Zhi et al.

(10) Patent No.: US 10,957,939 B2
(45) Date of Patent: Mar. 23, 2021

(54) RECHARGEABLE POLYACRYLAMIDE BASED POLYMER ELECTROLYTE ZINC-ION BATTERIES

(71) Applicant: City University of Hong Kong, Kowloon (HK)

(72) Inventors: Chunyi Zhi, Shatin (HK); Hongfei Li, Kowloon (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 15/805,779

(22) Filed: Nov. 7, 2017

(65) Prior Publication Data

US 2019/0140315 A1 May 9, 2019

(51) Int. Cl.
*H01M 10/0565* (2010.01)
*H01M 10/36* (2010.01)
(Continued)

(52) U.S. Cl.
CPC ..... *H01M 10/0565* (2013.01); *H01M 2/1653* (2013.01); *H01M 4/38* (2013.01);
(Continued)

(58) Field of Classification Search
CPC ........ H01G 11/06; H01G 11/26; H01G 11/36; H01G 11/46; H01G 11/52; H01G 11/62;
(Continued)

(56) References Cited

U.S. PATENT DOCUMENTS 2,647,938 A 8/1953 Taylor
4,306,061 A 12/1981 Majewicz
(Continued)

FOREIGN PATENT DOCUMENTS

CN 104240973 A 12/2014
CN 105845972 A 8/2016
(Continued)

OTHER PUBLICATIONS

Wang, H. et al. "Alternative Multifunctional Cyclic Organosilicon as an Efficient Electrolyte Additive for High Performance Lithium-Ion Batteries." Electrochim. Acta, vol. 254, pp. 112-122, (2017), 11 pages.
Zhang, S.S. "A Review on Electrolyte Additives for Lithium-Ion Batteries." J. Power Sources, vol. 162, pp. 1379-1394, (2006), 16 pages.
Arthur, T. S. et al. "Three-Dimensional Electrodes and Battery Architectures." MRS Bull. vol. 36, pp. 523-531, (2011), 9 pages.
Liu, L. et al. "Advances on Microsized On-Chip Lithium-Ion Batteries." Small, vol. 13, 1701847, (2017), 12 pages.
(Continued)

*Primary Examiner* — Adam A Arciero
(74) *Attorney, Agent, or Firm* — Norton Rose Fulbright US LLP

(57) ABSTRACT

Systems and methods which provide a polyacrylamide (PAM) based flexible and rechargeable zinc-ion battery (ZIB) configuration are described. Embodiments of a ZIB configuration comprise a PAM based polymer electrolyte. For example, a ZIB configuration of embodiments may comprise a manganese-dioxide ($MnO_2$) cathode, a zinc (Zn) anode, and a PAM based polymer electrolyte. The PAM based polymer electrolyte may comprise a PAM based polymer hosting one or more solutions to form a hydrogel electrolyte (e.g., crosslinked polyacrylamide hydrogel electrolyte). For example, the PAM based polymer electrolyte may be configured as a polyelectrolyte matrix host for the one or more solutions, such as may comprise a neutral solution of zinc sulfate and manganese sulfate, to achieve a stable electro chemical performance under the repetitive deformation conditions.

11 Claims, 14 Drawing Sheets

(51) Int. Cl.
| | |
|---|---|
| H01M 4/583 | (2010.01) |
| H01M 10/04 | (2006.01) |
| H01M 4/62 | (2006.01) |
| H01M 4/38 | (2006.01) |
| H01M 10/054 | (2010.01) |
| H01M 10/0568 | (2010.01) |
| H01M 4/50 | (2010.01) |
| H01M 2/16 | (2006.01) |
| H01M 4/02 | (2006.01) |

(52) U.S. Cl.
CPC ........... *H01M 4/502* (2013.01); *H01M 4/583* (2013.01); *H01M 4/624* (2013.01); *H01M 4/625* (2013.01); *H01M 10/04* (2013.01); *H01M 10/054* (2013.01); *H01M 10/0568* (2013.01); *H01M 10/36* (2013.01); *H01M 2004/027* (2013.01); *H01M 2004/028* (2013.01); *H01M 2300/0025* (2013.01)

(58) Field of Classification Search
CPC ........ H01G 11/64; H01G 11/78; H01G 11/86; H01M 10/054; H01M 10/0565; H01M 2300/0082; H01M 2300/0085; H01M 2/0275; H01M 4/0409; H01M 4/0452; H01M 4/502
See application file for complete search history.

(56) References Cited

U.S. PATENT DOCUMENTS

| | | | |
|---|---|---|---|
| 5,215,836 | A | 6/1993 | Eisenberg |
| 8,663,844 | B2 | 3/2014 | Kang et al. |
| 8,940,434 | B2 | 1/2015 | Khasanov et al. |
| 9,620,770 | B2 | 4/2017 | Takasaki et al. |
| 2003/0068559 | A1 | 4/2003 | Armstrong et al. |
| 2003/0165744 | A1* | 9/2003 | Schubert ............ H01M 2/0257 429/303 |
| 2005/0153208 | A1 | 7/2005 | Konishiike et al. |
| 2008/0008937 | A1 | 1/2008 | Eylem et al. |
| 2013/0130112 | A1 | 5/2013 | Chung et al. |
| 2013/0149580 | A1 | 6/2013 | Kim |
| 2013/0244101 | A1 | 9/2013 | Meckfessel Jones et al. |
| 2014/0050990 | A1 | 2/2014 | Yuan et al. |
| 2014/0205909 | A1* | 7/2014 | Yonehara ................ H01M 4/42 429/302 |
| 2015/0372270 | A1 | 12/2015 | Johns |
| 2016/0211547 | A1 | 7/2016 | Hwang et al. |
| 2016/0301096 | A1* | 10/2016 | Zhamu ................ H01M 10/054 |
| 2017/0222272 | A1* | 8/2017 | Takami ................ H01M 10/38 |

FOREIGN PATENT DOCUMENTS

| | | |
|---|---|---|
| CN | 106340395 A | 1/2017 |
| EP | 1402593 A1 | 3/2004 |
| EP | 2455997 A1 | 5/2012 |
| KR | 20070009231 A | 1/2007 |

OTHER PUBLICATIONS

Zhu, M. S. et al. "Capacitance Enhancement in a Semiconductor Nanostructure-Based Supercapacitor by Solar Light and a Self-Powered Supercapacitor Photodetector System." Adv. Funct. Mater., vol. 26, pp. 4481-4490, (2016), 10 pages.

Zhu, M. S. et al. "An Electrochromic Supercapacitor and its Hybrid Derivatives: Quantifiably Determining Their Electrical Energy Storage by an Optical Measurement." J. Mater. Chem. A, vol. 3, pp. 21321-21327, (2015), 7 pages.

Zhang, P. P. et al. "Stimulus-Responsive Micro-Supercapacitors with Ultrahigh Energy Density and Reversible Electrochromic Window." Adv. Mater., vol. 29, 1604491 (2017), 7 pages.

Manthiram, A. "An Outlook on Lithium Ion Battery Technology." ACS Central Sci., vol. 3, pp. 1063-1069, (2017), 7 pages.

Kim, H. et al. "Aqueous Rechargeable Li and Na Ion Batteries." Chem. Rev., vol. 114, pp. 11788-11827, (2014), 40 pages.

Sun, W. et al. "Zn/MnO2 Battery Chemistry With $H^+$ and $Zn^{2+}$ Coinsertion." J. Am. Chem. Soc., vol. 139, pp. 9775-9778, (2017), 4 pages.

Zhang, N. et al. "Rechargeable Aqueous Zinc-Manganese Dioxide Batteries with High Energy and Power Densities." Nat. Commun., vol. 8, 405, (2017), 9 pages.

Zhang, N. et al. "Cation-Deficient Spinel $ZnMn_2O_4$ Cathode in $Zn(CF_3SO_3)_2$ Electrolyte for Rechargeable Aqueous Zn-Ion Battery." J. Am. Chem. Soc., vol. 138, pp. 12894-12901, (2016), 8 pages.

Kundu, D. et al. "A High-Capacity and Long-Life Aqueous Rechargeable Zinc Battery Using a Metal Oxide Intercalation Cathode." Nat. Energy, vol. 1, 16119 (2016), 7 pages.

Suo, L. M. et al. ""Water-in-Salt" Electrolyte Makes Aqueous Sodium-Ion Battery Safe, Green, and Long-Lasting." Adv. Energy Mater., vol. 7, 1701189, (2017), 10 pages.

Yang, C. Y. et al. "Flexible Aqueous Li-Ion Battery with High Energy and Power Densities." Adv. Mater., vol. 29, 1701972 (2017), 8 pages.

Yamada, Y. et al. "Hydrate-Melt Electrolytes for High-Energy-Density Aqueous Batteries." Nat. Energy, vol. 1, 16129, (2016), 9 pages.

Suo, L. M. et al. ""Water-in-Salt" Electrolyte Enables High-Voltage Aqueous Lithium-Ion Chemistries." Science, vol. 350, pp. 938-943, (2015), 6 pages.

Boles, M. A. et al. "Self-Assembly of Colloidal Nanocrystals: From Intricate Structures to Functional Materials." Chem. Rev., vol. 116, pp. 11220-11289, (2016), 70 pages.

Talapin, D. V. et al. "Prospects of Colloidal Nanocrystals for Electronic and Optoelectronic Applications." Chem. Rev., vol. 110, pp. 389-458, (2010), 70 pages.

Gaponik, N. et al. "Thiol-capping of CdTe Nanocrystals: An Alternative to Organometallic Synthetic Routes." J. Phys. Chem. B, vol. 106, pp. 7177-7185, (2002), 9 pages.

Rogach, A. L. et al. "Aqueous Synthesis of Thiol-Capped CdTe Nanocrystals: State-of-the-Art." J. Phys. Chem. C, vol. 111, 14628-14637, (2007), 10 pages.

Kim, J. Y. et al. "25th Anniversary Article: Colloidal Quantum Dot Materials and Devices: A Quarter-Century of Advances." Adv. Mater., vol. 25, pp. 4986-5010 (2013), 25 pages.

Palui, G. et al. "Strategies for Interfacing Inorganic Nanocrystals With Biological Systems Based on Polymer-Coating." Chem. Soc. Rev., vol. 44, pp. 193-227, (2015), 35 pages.

Tang, Q. W. et al. Effect of Surface Manganese Valence of Manganese Oxides on the Activity of the Oxygen Reduction Reaction in Alkaline Media. ACS Catal., vol. 4, pp. 457-463 (2014), 7 pages.

Song, Y. et al. "Pushing the Cycling Stability Limit of Polypyrrole for Supercapacitors." Adv. Funct. Mater., vol. 25, pp. 4626-4632, (2015), 7 pages.

Yuan, X. X. et al. "Improved Performance of Proton Exchange Membrane Fuel Cells with p-Toluenesulfonic Acid-Doped Co-PPy/C as Cathode Electrocatalyst." J. Am. Chem. Soc., vol. 132, pp. 1754-1755, (2010), 2 pages.

Adam, M. et al. "Implementation of High-Quality Warm-White Light-Emitting Diodes by a Model-Experimental Feedback Approach Using Quantum Dot-Salt Mixed Crystals." ACS Appl. Mater. Interfaces, vol. 7, pp. 23364-23371, (2015), 8 pages.

Adam, M. et al. "Colloidal Nanocrystals Embedded in Macrocrystals: Methods and Applications." J. Phys. Chem. Lett., pp. 4117-4123, (2016), 7 pages.

Otto, T. et al. "Colloidal Nanocrystals Embedded in Macrocrystals: Robustness,Photostability, and Color Purity." Nano Lett., vol. 12, pp. 5348-5354, (2012), 7 pages.

Zhang, F. et al. "Brightly Luminescent and Color-Tunable Colloidal $CH_3NH_3PbX_3$ (X=Br, I, Cl) Quantum Dots: Potential Alternatives for Display Technology." ACS Nano, vol. 9, pp. 4533-4542, (2015), 10 pages.

Wang, X. Y. et al. "Surface-Related Emission in Highly Luminescent CdSe Quantum Dots." Nano Lett., vol. 3, pp. 1103-1106, (2003), 4 pages.

(56) References Cited

OTHER PUBLICATIONS

Lu, Y. Y. et al. "Stable Cycling of Lithium Metal Batteries Using High Transference Number Electrolytes.", Adv. Energy Mater., vol. 5, 1402073 (2015), 7 pages.

Liu, W. et al. "Enhancing Ionic Conductivity in Composite Polymer Electrolytes with Well-Aligned Ceramic Nanowires." Nat. Energy, vol. 2, 17035 (2017), 7 pages.

Hayes, A. C. et al. "Raman Spectroscopic Study of Aqueous $(NH_4)_2SO_4$ and $ZnSO_4$ Solutions." J. Solution Chem., vol. 13, pp. 61-75, (1984), 15 pages.

Liu, W. et al. "Improved Lithium Ionic Conductivity in Composite Polymer Electrolytes with Oxide-Ion Conducting Nanowires." ACS Nano, vol. 10, pp. 11407-11413, (2016), 7 pages.

Wu, Z.-S. et al. "Graphene-Based In-Plane Micro-Supercapacitors with High Power and Energy Densities." Nat. Commun.,vol. 4, 2487 (2013), 8 pages.

El-Kady, M. F. et al. "Scalable Fabrication of High-Power Graphene Micro-Supercapacitors for Flexible and On-Chip Energy Storage." Nat. Commun., vol. 4, 1475 (2013), 9 pages.

Li, L. et al."High-Performance Pseudocapacitive Microsupercapacitors from Laser-Induced Graphene." Adv. Mater., vol. 28, pp. 838-845, (2016), 8 pages.

Pikul, J.H. et al."High-Power Lithium Ion Microbatteries From Interdigitated Three-Dimensional Bicontinuous Nanoporous Electrodes." Nat. Commun., vol. 4, 1732 (2013), 5 pages.

Sun, K. et al. "3D Printing of Interdigitated Li-Ion Microbattery Architectures." Adv. Mater., vol. 25, pp. 4539-4543, (2013), 5 pages.

Ning, H. L. et al. "Holographic Patterning of High-Performance On-Chip 3D Lithium-Ion Microbattenes." P. Natl. Acad. Sci. USA, vol. 112, pp. 6573-6578, (2015), 6 pages.

Yu, W. W. et al. "Experimental Determination of the Extinction Coefficient of CdTe, CdSe, and CdS Nanocrystals." Chem. Mater., vol. 15, pp. 2854-2860, (2003), 7 pages.

Song, Y. et al. "Electrochemical Anchoring of Dual Doping Polypyrrole on Graphene Sheets Partially Exfoliated From Graphite Foil for High-Performance Supercapacitor Electrode." J. Power Sources, vol. 249, pp. 48-58, (2014), 11 pages.

Kim, D.-H. et al. "Silicon Electronics on Silk as a Path to Bioresorbable, Implantable Devices," Appl. Phys. Lett., 95, 133701, 2009, 3 pages.

Sun, H. et al. "Large-Area Supercapacitor Textiles with Novel Hierarchical Conducting Structures," Adv. Mater., vol. 28, No. 38, pp. 8431-8438, Oct. 2016, 8 pp.

Huang, Y. et al. "Robust Reduced Graphene Oxide Paper Fabricated With a Household Non-Stick Frying Pan: A Large-Area Freestanding Flexible Substrate for Supercapacitors," RSC Adv., vol. 5, No. 43, pp. 33981-33989, Mar. 2015, 9 pages.

Lu, X. et al. "Flexible Solid-State Supercapacitors: Design, Fabrication and Applications," Energy Environ. Sci., vol. 7, pp. 2160-2181, 2014, 22 pages.

Yu, D. et al. "Transforming Pristine Carbon Fiber Tows into High Performance Solid-State Fiber Supercapacitors," Adv. Mater., vol. 27, pp. 4895-4901, 2015, 7 pages.

Zhou, G. et al. "Progress in Flexible Lithium Batteries and Future Prospects," Energ. Environ. Sci., vol. 7, pp. 1307-1338, 2014, 32 pages.

Huang, Y. et al. "A Modularization Approach for Linear-Shaped Functional Supercapacitors," J. Mater. Chem. A, vol. 4, No. 12, pp. 4580-4586, Feb. 2016, 7 pages.

Sun, H. et al. "Energy Harvesting and Storage in 10 Devices," Nat. Rev. Mater., vol. 2, 17023, 2017, 12 pages.

Wang, X. et al. "Flexible Fiber Energy Storage and Integrated Devices: Recent Progress and Perspectives," Mater. Today, vol. 18, pp. 265-272, Jun. 2015, 8 pages.

Kwon, Y. H. et al. "Cable-Type Flexible Lithium Ion Battery Based on Hollow Multi-Helix Electrodes," Adv. Mater., vol. 24, pp. 5192-5197, 2012, 6 pages.

Hoshide, T. et al. "Flexible Lithium-Ion Fiber Battery by the Regular Stacking of Two-Dimensional Titanium Oxide Nanosheets Hybridized with Reduced Graphene Oxide," Nano Lett., vol. 17, No. 6, pp. 3543-3549, 2017, 7 pages.

Fang, X. et al. "A Cable-Shaped Lithium Sulfur Battery," Adv. Mater., vol. 28 (3), pp. 491-496, 2016, 6 pages.

Kou, L. et al. "Coaxial Wet-Spun Yam Supercapacitors for High-Energy Density and Safe Wearable Electronics," Nat. Commun., vol. 5, 3754, 2014, 10 pages.

Choi, C. et al. "Improvement of System Capacitance via Weavable Superelastic Biscrolled Yam Supercapacitors," Nat. Commun., vol. 7, 13811, 2016, 8 pages.

Yu, D. et al. "Scalable Synthesis of Hierarchically Structured Carbon Nanotube-Graphene Fibres for Capacitive Energy Storage," Nat. Nanotechnol., vol. 9, pp. 555-562, 2014, 9 pages.

Shen, Y W. et al. "The Mechanism of Capacity Fade of Rechargeable Alkaline Manganese Dioxide Zinc Cells," J. Power Sources, vol. 87, pp. 162-166, 2000, 5 pages.

Yu, X. et al. "Flexible Fiber-Type Zinc-Carbon Battery Based on Carbon Fiber Electrodes," Nano Energy, vol. 2, No. 6, pp. 1242-1248, 2013, 7 pages.

Gaikwad, A. M. et al. "Highly Flexible, Printed Alkaline Batteries Based on Mesh-Embedded Electrodes," Adv. Mater., vol. 23, pp. 3251-3255, 2011, 5 pages.

Wang, Z. et al. "Fabrication of High-Performance Flexible Alkaline Batteries by Implementing Multiwalled Carbon Nanotubes and Copolymer Separator," Adv. Mater., vol. 26, pp. 970-976, 2014, 7 pages.

Xu, C. et al. "Energetic Zinc Ion Chemistry: The Rechargeable Zinc Ion Battery," Angew. Chem. Int. Ed., vol. 51, pp. 933-935, 2012, 3 pages.

Pan, H. et al. "Reversible Aqueous Zinc/Manganese Oxide Energy Storage From Conversion Reactions," Nat. Energy, vol. 1, 16039, 2016, 7 pages.

Lee, B. et al. "Electrochemically-Induced Reversible Transition from the Tunneled to Layered Polymorphs of Manganese Dioxide," Sci. Rep., vol. 4, pp. 6066-6074, 2014, 8 pages.

Alfaruqi, M. H. et al. "A Layered δ-$MnO_2$ Nanoflake Cathode with High Zinc-Storage Capacities for Eco-Friendly Battery Applications," Electrochem. Commun., vol. 60, pp. 121-125, 2015, 5 pages.

Alfaruqi, M. H. et al. "Electrochemically Induced Structural Transformation in a γ-MnO, Cathode of a High Capacity Zinc-Ion Battery System," Chem. Mater., vol. 27, pp. 3609-3620, 2015, 12 pages.

Huang, Y. et al. "A Polyacrylamide Hydrogel Electrolyte Enabled Intrinsically 1000% Stretchable and 50% Compressible Supercapacitor," Angew. Chem. Int. Ed., vol. 129, 2017, 7 pages.

Choudhury, N. A. et al. "Hydrogel-Polymer Electrolytes for Electrochemical Capacitors: An Overview," Energy Environ. Sci., vol. 2 (1), pp. 55-67, 2009, 13 pages.

Yang, F. et al. "Synthesis, Characterization, and Applied Properties of Carboxymethyl Cellulose and Polyacrylamide Graft Copolymer," Carbohyd. Polym., vol. 78, pp. 95-99, 2009, 5 pages.

Hu, X. et al. "Synthesis and Characterization of a Novel Hydrogel: Salecan/Polyacrylamide Semi-IPN Hydrogel with a Desirable Pore Structure," J. Mater. Chem. B, vol. 2, pp. 3646-3658, 2014, 13 pages.

Ghosh, P. et al. "Studies on Stable Aqueous Polyaniline Prepared with the Use of Polyacrylamide as the Water Soluble Support Polymer," Eur. Polym. J., vol. 35, pp. 803-813, 1999, 11 pages.

Biswal, D. R. et al. "Flocculation Studies Based on Water-Soluble Polymers of Grafted Carboxymethyl Cellulose and Polyacrylamide," J. Appl. Polym. Sci., vol. 102, pp. 1000-1007, 2006, 8 pages.

Biswal, D. R. et al. "Characterisation of Carboxymethyl Cellulose and Polyacrylamide Graft Copolymer," Carbohyd. Polym., vol. 57, pp. 379-387, 2004, 9 pages.

Liu, J. et al. "A Flexible Quasi-Solid-State Nickel-Zinc Battery with High Energy and Power Densities Based on 3D Electrode Design," Adv. Mater., vol. 28, 8732-8739, 2016, 8 pages.

Pech, D. et al. "Ultrahigh-Power Micrometre-Sized Supercapacitors Based on Onion-Like Carbon," Nat. Nanotechnol., vol. 5, pp. 651-654, 2010, 4 pages.

Yang, Y. et al. "Waterproof, Ultrahigh Areal-Capacitance, Wearable Supercapacitor Fabrics," Adv. Mater., vol. 29, 1606679, 2017, 9 pages.

(56) References Cited

OTHER PUBLICATIONS

Deng, J. et al. "A Shape-Memory Supercapacitor Fiber," Angew. Chem. Int. Ed., vol. 54, pp. 15419-15423, 2015, 5 pages.
You, J. et al. "A Polymer Tandem Solar Cell with 10.6% Power Conversion Efficiency," Nat. Commun., vol. 4, 1446, 2013, 10 pages.
Liu, W. et al. "Solar-Induced Direct Biomass-to-Electricity Hybrid Fuel Cell Using Polyoxometalates as Photocatalyst and Charge Carrier," Nat. Commun., vol. 5, 3208, 2014, 8 pages.
Snyder, G. J. et al. "Complex Thermoelectric Materials," Nat. Mater., vol. 7, pp. 105-114, 2008, 10 pages.
Sun, Y. et al. "Promises and Challenges of Nanomaterials for Lithium-Based Rechargeable Batteries," Nature Energy, vol. 1, 16071, 2016, 12 pages.
Ji, L. et al. "Recent Developments in Nanostructured Anode Materials for Rechargeable Lithium-Ion Batteries," Energy Environ. Sci., vol. 4, pp. 2682-2699, 2011, 18 pages.
Kim, S.-W. et al. "Electrode Materials for Rechargeable Sodium-Ion Batteries: Potential Alternatives to Current Lithium-Ion Batteries," Adv. Energy Mater., vol. 2, pp. 710-721, 2012, 12 pages.
Goodenough, J. B. et al "The Li-Ion Rechargeable Battery: A Perspective," J. Am. Chem. Soc., vol. 135, pp. 1167-1176, 2013, 10 pages.
Wang, X. et al "An Aqueous Rechargeable $Zn//Co_3O_{40}$ Battery with High Energy Density and Good Cycling Behavior," Adv. Mater., vol. 28, pp. 4904-4911, 2016, 8 pages.
Liu, B. et al. "Hierarchical Three-Dimensional $ZnCo_2O_4$ Nanowire Arrays/Carbon Cloth Anodes for a Novel Class of High-Performance Flexible Lithium-Ion Batteries," Nano Lett., vol. 12, pp. 3005-3011, 2012, 7 pages.
Koo, M. et al "Bendable Inorganic Thin-Film Battery for Fully Flexible Electronic Systems," Nano Lett., vol. 12, pp. 4810-4816, 2012, 7 pages.
Wang, C. et al. "Functionalized Polythiophene-Coated Textile: A New Anode Material for a Flexible Battery," J. Power Sources, vol. 156, pp. 610-614, 2006, 5 pages.
Liu, W. et al. "3D Porous Sponge-Inspired Electrode for Stretchable Lithium-Ion Batteries," Adv. Mater., vol. 28, pp. 3578-3583, 2016, 6 pages.
Huang, Y. et al. "A Self-Healable and Highly Stretchable Supercapacitor Based on a Dual Crosslinked Polyelectrolyte," Nat. Comm., vol. 6, 10310, 2015, 8 pages.
Frenzel, J. et al. "Influence of Ni on Martensitic Phase Transformations in NiTi Shape Memory Alloys," Acta Materialia, vol. 58, pp. 3444-3458, 2010, 15 pages.
Nespoli, A. et al. "The High Potential of Shape Memory Alloys in Developing Miniature Mechanical Devices: A Review on Shape Memory Alloy Mini-Actuators," Sensors and Actuators A: Physical, vol. 158, pp. 149-160, 2010, 12 pages.
Jung, H. et al. "Nanosize Si Anode Embedded in Super-Elastic Nitinol (Ni—Ti) Shape Memory Alloy Matrix for Li Rechargeable Batteries," J. Mater. Chem., vol. 21, pp. 11213-11216, 2011, 4 pages.
Huang, Y. et al. "A Shape Memory Supercapacitor and its Application in Smart Energy Storage Textiles," J. Mater. Chem. A, vol. 4, pp. 1290-1297, 2016, 8 pages.
Li, Y.-Q. et al. "Remarkable Improvements in Volumetric Energy and Power of 3D $MnO_2$ Microsupercapacitors by Tuning Crystallographic Structures," Adv. Funct. Mater., vol. 26, pp. 1830-1839, 2016, 10 pages.
Zhu, M. et al. "Highly Flexible, Freestanding Supercapacitor Electrode with Enhanced Performance Obtained by Hybridizing Polypyrrole Chains with MXene," Adv.Energy Mater., vol. 6, 1600969, 2016, 9 pages.
Huang, Y. et al. "Extremely Stable Polypyrrole Achieved via Molecular Ordering for Highly Flexible Supercapacitors," ACS Appl. Mater. and Interfaces, vol. 8, pp. 2435-2440, 2016, 6 pages.

Huang, Y. et al. "Enhanced Tolerance to Stretch-Induced Performance Degradation of Stretchable $MnO_2$-Based Supercapacitors," ACS Appl. Mater. and Interfaces, vol. 7, pp. 2569-2574, 2015, 6 pages.
Li, M. et al."Polypyrrole Nanofiber Arrays Synthesized by a Biphasic Electrochemical Strategy," J. Mater. Chem., vol. 18, pp. 2276-2280, 2008, 5 pages.
Xie, Y. et al. "Electrochemical Capacitance of a Carbon Quantum Dots-Polypyrrole/Titania Nanotube Hybrid," RSC Adv., vol. 5, pp. 89689-89697, 2015, 9 pages.
Kuang, P.-Y. et al. "Anion-assisted One-Pot Synthesis of 1D Magnetic $\alpha$- and $\beta$-$MnO_2$ Nanostructures for Recyclable Water Treatment Application," New J. Chem., vol. 39, pp. 2497-2505, 2015, 9 pages.
Cai, G. et al. "Extremely Stretchable Strain Sensors Based on Conductive Self-Healing Dynamic Cross-Links Hydrogels for Human-Motion Detection," Adv. Sci., 4, 1600190, 2017, 7 pages.
Spoljaric, S. "Stable, Self-healing Hydrogels from Nanofibrillated Cellulose, Poly(Vinyl Alcohol) and Borax via Reversible Crosslinking," Eur. Polym. J., vol. 56, pp. 105-117, 2014, 41 pages.
Zeng, Y. et al. "Achieving Ultrahigh Energy Density and Long Durability in a Flexible Rechargeable Quasi-Solid-State $Zn$-$Mno_2$ Battery" Adv. Mater. vol. 29. 2017, 7 pages.
Huang, Y. et al. "From Industrially Weavable and Knittable Highly Conductive Yarns to Large Wearable Energy Storage Textiles." ACS Nano, vol. 9, pp. 4766-4775, (2015), 29 pages.
Huang. Y. et al. "Weavable, Conductive Yarn-Based NiCo//Zn Textile Battery with High Energy Density and Rate Capability." ACS Nano, vol. 11, pp. 8953-8961, (2017), 9 pages.
Zeng, Y. et al. "Flexible Ultrafast Aqueous Rechargeable Ni//Bi Battery Based on Highly Durable Single-Crystalline Bismuth Nano-Structured Anode." Adv. Mater, vol. 28, pp. 9188-9195, (2016), 8 pages.
Liu. J. L. et al. "A Flexible Alkaline Rechargeable Ni/Fe Battery Based on Graphene Foam/Carbon Nanotubes Hybrid Film." Nano Lett., vol. 14, pp. 7180-7187, (2014), 8 pages.
Wang, G. J. et al. "An Aqueous Rechargeable Lithium Battery Based on Doping and Intercalation Mechanisms." J. Solid State Electrochem, vol. 14, pp. 865-869, (2010), 5 pages.
Lee D. U. et al. "Self-Assembled $NiO/Ni(OH)_2$ Nanoflakes as Active Material for High-Power and High-Energy Hybrid Rechargeable Battery." Nano Lett., vol. 16, pp. 1794-1802, (2016), 9 pages.
Lee, J. H. et al. "Stabilized Octahedral Frameworks in Layered Double Hydroxides by Solid-Solution Mixing of Transition Metals." Adv. Funct. Mater., vol. 27, 1605225, (2017), 10 pages.
Yuan, C. Z. et al. "Ultrathin Mesoporous $NiCo_2O_4$ Nanosheets Supported on Ni Foam as Advanced Electrodes for Supercapacitors." Adv. Funct. Mater., vol. 22, pp. 4592-4597, (2012), 6 pages.
Xu, C. et al. "An Ultrafast, High Capacity and Superior Longevity Ni/Zn Battery Constructed on Nickel Nanowire Array Film." Nano Energy, vol. 30, pp. 900-908, (2016), 26 pages.
Huang, Y. et al. "Magnetic-Assisted, Self-Healable, Yarn-Based Supercapacitor." ACS Nano, vol. 9, pp. 6242-6251, (2015), 10 pages.
Jimenez, V. M. et al. "The State of the Oxygen at the Surface of Polycrystalline Cobalt Oxide." J. Electron Spectrosc. Relat. Phenom., vol. 71, pp. 61-71, (1995), 11 pages.
Li Y. G. et al. "Recent Advances in Zinc-Air Batteries." Chem. Soc. Rev., vol. 43, pp. 5257-5275, (2014), 19 pages.
See, D. M. et al. "Temperature and Concentration Dependence of the Specific Conductivity of Concentrated Solutions of Potassium Hydroxide." J. Chem. Eng. Data, vol. 42, pp. 1266-1268, (1997), 3 pages.
Xu, J. et al. "Flexible Asymmetric Supercapacitors Based Upon $Co_9S_8$ Nanorod//$Co_3O_4$@$RuO_2$ Nanosheet Arrays on Carbon Cloth." ACS Nano, vol. 7, pp. 5453-5462, (2013), 10 pages.
Yu, D. S. et al. "Controlled Functionalization of Carbonaceous Fibers for Asymmetric Solid-State Micro-Supercapacitors with High Volumetric Energy Density." Adv. Mater., vol. 26, pp. 6790-6797, (2014), 8 pages.
Xia, C. et al. "Highly Stable Supercapacitors with Conducting Polymer Core-Shell Electrodes for Energy Storage Applications." Adv. Energy, Mater., vol. 5, 1401805, (2015), 9 pages.

(56) References Cited

OTHER PUBLICATIONS

Sun, J. F. et al. "Assembly and Electrochemical Properties of Novel Alkaline Rechargeable Ni/Bi Battery Using Ni(OH)$_2$ and (BiO)$_4$CO$_3$(OH)$_2$ Microspheres as Electrode Materials." J. Power Sources, vol. 274, pp. 1070-1075, (2015), 6 pages.

Yesibolati, N. et al. "High Performance Zn/LiFePO$_4$ Aqueous Rechargeable Battery for Large Scale Applications." Electrochim. Acta, vol. 152, pp. 505-511, (2015), 7 pages.

Liu, N. S. et al. "Cable-Type Supercapacitors of Three-Dimensional Cotton Thread Based Multi-Grade Nanostructures for Wearable Energy Storage." Adv. Mater., vol. 25, pp. 4925-4931, (2013), 7 pages.

Tao, J. Y. et al. "Solid-State High Performance Flexible Supercapacitors Based on Polypyrrole-MnO$_2$-Carbon Fiber Hybrid Structure." Sci. Rep., vol. 3, 2286, (2013), 7 pages.

Guan, C. et al. "High-Performance Flexible Solid-State Ni/Fe Battery Consisting of Metal Oxides Coated Carbon Cloth/Carbon Nanofiber Electrodes." Adv. Energy Mater., vol. 6, 1601034, (2016), 9 pages.

Li, R. Z. et al. "Carbon-Stabilized High-Capacity Ferroferric Oxide Nanorod Array for Flexible Solid-State Alkaline Battery-Supercapacitor Hybrid Device with High Environmental Suitability." Adv. Funct. Mater., vol. 25, pp. 5384-5394, (2015), 11 pages.

Zhou, C. et al. "Construction of High-Capacitance 3D CoO@Polpyrrole Nanowire Array Electrode for Aqueous Asymmetric Supercapacitor." Nano Lett., vol. 13, pp. 2078-2085, (2013), 8 pages.

Lu, X. H. et al. "H—TiO$_2$@MnO$_2$//H—TiO$_2$@C Core-Shell Nanowires for High Performance and Flexible Asymmetric Super-Capacitors." Adv. Mater., vol. 25, pp. 267-272, (2013), 6 pages.

Yang, P.H. et al. "Low-Cost High-Performance Solid-State Asymmetric Supercapacitors Based on MnO$_2$ Nanowires and Fe$_2$O$_3$ Nanotubes." Nano Lett., vol. 14, pp. 731-736, (2014), 6 pages.

Zhu, C. R. et al. "All Metal Nitrides Solid-State Asymmetric Supercapacitors." Adv. Mater., vol. 27, pp. 4566-4571, (2015), 6 pages.

Yu, M. H. et al. "Holey Tungsten Oxynitride Nanowires: Novel Anodes Efficiently Integrate Microbial Chemical Energy Conversion and Electrochemical Energy Storage." Adv. Mater., vol. 27, pp. 3085-3091, (2015), 7 pages.

Zeng, Y. X. et al. "Advanced Ti-Doped Fe$_2$O$_3$@PEDOT Core/Shell Anode for High-Energy Asymmetric Super-Capacitors." Adv. Energy Mater., vol. 5, 1402176, (2015), 7 pages.

Lu, X. H. et al. "High Energy Density Asymmetric Quasi-Solid-State Supercapacitor Based on Porous Vanadium Nitride Nanowire Anode." Nano Lett., vol. 13, pp. 2628-2633, (2013), 6 pages.

Wang, X. F. et al. "Fiber-Based Flexible All-Solid-State Asymmetric Supercapacitors for Integrated Photodetecting System." Angew. Chem., Int. Ed., vol. 53, pp. 1849-1853, (2014), 5 pages.

Bae, J. et al. "Fiber Supercapacitors Made of Nanowire-Fiber Hybrid Structures for Wearable/Flexible Energy Storage." Angew. Chem. Int. Ed., vol. 50, pp. 1683-1687, (2011), 5 pages.

Chen, T. et al. "An Integrated "Energy Wire" for Both Photoelectric Conversion and Energy Storage." Angew. Chem., Int. Ed., vol. 51, pp. 11977-11980, (2012), 4 pages.

Ren, J. et al. "Twisting Carbon Nanotube Fibers for Both Wire-Shaped Micro-Supercapacitor and Micro-Battery." Adv. Mater., vol. 25, pp. 1155-1159, (2013), 5 pages.

Wu, X. C. et al. "High-Performance Aqueous Battery with Double Hierarchical Nanoarrays." Nano Energy, vol. 10, pp. 229-234, (2014), 6 pages.

Wang, H. L. et al. "An Ultrafast Nickel-Iron Battery from Strongly Coupled Inorganic Nanoparticle/Nanocarbon Hybrid Materials." Nat. Commun., vol. 3, 917, (2012), 8 pages.

Yoshima, K. et al. "Fabrication of Micro Lithium-Ion Battery with 3D Anode and 3D Cathode by Using Polymer Wall." J. Power Sources, vol. 208, pp. 404-408, (2012), 5 pages.

El-Kady, M. F. et al. "Laser Scribing of High-Performance and Flexible Graphene-Based Electrochemical Capacitors." Science, vol. 335, pp. 1326-1330, (2012), 5 pages.

Yifan, X. et al. "An All-Solid-State Fiber-Shaped Aluminum-Air Battery with Flexibility, Stretchability, and High Electrochemical Performance." Angew, Chem. Int. Ed., vol. 55, pp. 7979-7982, (2016), 4 pages.

Zhang, Y. et al. "Advances in Wearable Fiber-Shaped Lithium-Ion Batteries." Adv. Mater., vol. 28, pp. 4524-4531, (2016), 8 pages.

Weng, W. et al. "Smart Electronic Textiles." Angew. Chem. Int. Ed., vol. 55, pp. 6140-6169, (2016), 30 pages.

Sinton, S. W. "Complexation Chemistry of Sodium Borate with Poly(vinyl alcohol) and Small Diols. A $^{11}$B NMR Study," Macromolecules vol. 20, 1987, 12 pages.

\* cited by examiner

RECHARGEABLE POLYACRYLAMIDE BASED POLYMER ELECTROLYTE ZINC-ION BATTERIES

CROSS-REFERENCE TO RELATED APPLICATION

The present application is related to co-pending and commonly assigned U.S. patent application Ser. No. 15/805,817 entitled "RECHARGEABLE ZINC-ION BATTERIES HAVING FLEXIBLE SHAPE MEMORY" filed concurrently herewith on Nov. 7, 2017, the disclosure of which is hereby incorporated herein by reference.

TECHNICAL FIELD

The present invention relates generally to energy-storage devices and, more particularly, to zinc-ion battery configurations using a polyacrylamide (PAM) based polymer electrolyte.

BACKGROUND OF THE INVENTION

The emerging research toward the next-generation flexible and wearable electronics has stimulated the efforts to build highly flexible, durable and deformable energy-storage devices with excellent electrochemical performances. For example, flexible or wearable electronics are leading the trend of next-generation consumer electronic products and they are finding more applications in sportswear, pressure sensors, military uniforms, and implantable medical devices. A key challenge identified in this field is how to fabricate highly deformable, durable, and wearable energy-storage devices with excellent electrochemical performance and shape versatility for powering such next-generation electronic products.

One-dimensional (1D) fiber yarn based energy-storage devices may offer a solution for the flexible or wearable demands of next-generation electronic products, owing to their unique and promising properties such as light weight, tiny volume, excellent wearability and integratability with traditional cloths. Accordingly, some efforts have been directed toward developing different 1D linear energy-storage devices such as lithium ion batteries, lithium sulfur batteries, primary batteries, and supercapacitors. However, lithium ion batteries suffer from intrinsic safety and cost issues, and the applications of supercapacitors are vastly restricted by their insufficient energy density. Accordingly, these energy-storage devices may not provide satisfactory solutions for powering the aforementioned next-generation electronic products. Moreover, energy-storage devices utilized with respect to flexible or wearable next-generation electronic products should be able to deliver high energy capacity while maintaining their electrochemical functions under different conditions, such as being bent, stretched, cut or even washed in water. The foregoing battery configurations resulting from current research in yarn batteries or power-type supercapacitors cannot satisfy these requirements.

Zinc-manganese dioxide ($Zn-MnO_2$) battery configurations have been considered as one of the most popular primary cells over the past one hundred years, due to its unique features such as low cost, eco-friendliness, good specific capacity, and ease of fabrication. These attractive characteristics, combined with the increasing need for high-performance flexible power sources, have prompted considerable efforts in developing flexible batteries based on $Zn-MnO^2$ configurations. Yu, X. et al., "Flexible Fiber-type zinc-carbon battery based on carbon fiber electrodes," *Nano Energy*, 2013, 6, 1242-1248, the disclosure of which is incorporated herein by reference, introduced a flexible fiber-type $Zn-MnO_2$ configuration using carbon fibers as the current collector. Gaikwad, A. M. et al., "Highly flexible, printed alkaline batteries based on mesh-embedded electrodes," *Adv. Mater.*, 2011, 23, 3251-3255, and Wang, Z. Q. et al, "Fabrication of high-performance alkaline batteries by implementing multiwalled carbon nanottibes and copolymer separator," *Adv. Mater.*, 2014, 26, 970-976, the disclosures of which are incorporated herein by reference, demonstrated flexible alkaline batteries based on polymer gel electrolyte, exhibiting superior discharge performance and good flexibility. However, these flexible $Zn-MnO_2$ battery configurations are not rechargeable and suffer from sharp capacity attenuation.

Recently, a novel rechargeable zinc-ion battery (ZIB) configuration has been proposed, which evolves the primary $Zn-MnO_2$ batteries into highly reversible energy storage systems, see C. J. Xu et al., "Energetic zinc ion chemistry: the rechargeable zinc ion battery," *Angew. Chem. Int. Ed.*, 2012, 51, 933-935, H. Pan et al., "Reversible aqueous zinc/manganese oxide energy storage from conversion reactions," *Nat. Energy*, 2016, 1, 16039, Lee, B., et al., Electrochemically-induced reversible transition from the tunneled to layered polymorphs of manganese dioxide, *Sci. Rep.*, 2014, 4, 6066-6074, M. H. Alfaruqi, J. Gim, S. Kim, et al., "A layered $\delta$-$MnO_2$ nanoflake cathode with high zinc-storage capacities for eco-friendly battery applications," *Electrochem. Commun.*, 2015, 60: 121-125, and M. H. Alfaruqi, V. Mathew, J. Gim, et al., "Electrochemically induced structural transformation in a $\delta$-$MnO_2$ cathode of a high capacity zinc-ion battery system," *Chem. Mater.*, 2015, 27, 3609-3620, the disclosures of which are incorporated herein by reference. Nevertheless, 1D flexible and rechargeable ZIBs with good wearability, high energy density, and excellent cycling performance remain a challenge. For example, a key component of the ZIB for a stretchable and wearable design is a solid-state electrolyte. The widely used polyvinyl alcohol (PVA)-based electrolytes suffer from low elasticity, low ionic conductivity and poor mechanical strength. Hydrogels, as hydrophilic polymer networks swollen with a large amount of water, can dissolve different kinds of ions, making themselves serve as good ionic conductors.

BRIEF SUMMARY OF THE INVENTION

The present invention is directed to systems and methods which provide a polyacrylamide (PAM) based flexible and rechargeable zinc-ion battery (ZIB) configuration. Embodiments of a ZIB configuration in accordance with concepts of the present invention comprise a PAM based polymer electrolyte. For example, a ZIB configuration of embodiments may comprise a manganese-dioxide ($MnO_2$) cathode, a zinc (Zn) anode, and a PAM based polymer electrolyte.

A PAM based polymer electrolyte of embodiments is configured to provide a highly porous 3D architecture and high level of water retention in the polymeric network thereof. Accordingly, a PAM based polymer electrolyte of embodiments exhibits an ultra-high ionic conductivity while maintaining remarkable flexibility and favorable mechanical strength. A PAM based polymer electrolyte of embodiments of the invention may, for example, provide a highly flexible polymer host configured to combine with one or more solutions (e.g., a neutral solution of divalent zinc salt ($Zn^{2+}$)) to form a hydrogel electrolyte.

ZIB configurations comprising a PAM based polymer electrolyte in accordance with concepts of the present invention provide high reversibility, high flexibility, outstanding cycling stability, and good rate performance, unlike the traditional Zn—MnO$_2$ batteries. Accordingly, ZIB configurations comprising a PAM based polymer electrolyte of embodiments may serve as a reliable power source under various conditions, including some relatively harsh conditions, such as being bent, hit, cut, punctured, set on fire, washed, etc.

Moreover, the components (e.g., comprising a MnO$_2$ cathode, a Zn anode, and a PAM based polymer Zn$^{2+}$ hydrogel electrolyte) of ZIB configurations comprising a PAM based polymer electrolyte of embodiments are low-cost, nontoxic, noncorrosive, and can be easily fabricated. For example, the assembly process for configurations of a ZIB comprising a PAM based polymer electrolyte of embodiments herein may be carried out in open atmosphere, without requiring a water and oxygen-free environment or any other significant protection measures, which not only facilitates economical production but is also very beneficial for scaling up. Moreover, a flexible ZIB configuration comprising a PAM based polymer electrolyte may readily be made into various sizes and shapes, whether 1D, 2D, or 3D, due to the presence of PAM based electrolyte in accordance with concepts herein.

From the foregoing, it can be appreciated that ZIB configurations comprising a PAM based polymer electrolyte in accordance with concepts of the present invention, providing low cost, high capacity, outstanding flexibility, and high safety, may serve as an ideal power source for the flexible or wearable demands of next-generation electronic products, such as in flexible cell phones, humanlike electronic skins, and flexible displays. Of course, configurations of ZIBs comprising a PAM based polymer electrolyte according to the concepts herein may be used in other fields, such as transportation, military, robotics, sports, medical diagnostics, etc.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
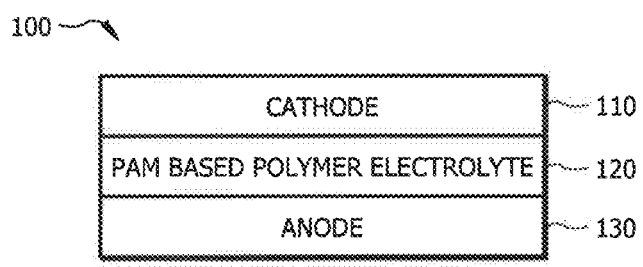
FIG. 1 shows a high level block diagram of a polyacrylamide (PAM) based polymer electrolyte zinc-ion battery (ZIB) configuration according to embodiments of the invention.

Polyacrylamide (PAM) based polymer electrolyte zinc-ion battery (ZIBs), as may be used in various implementations in which an energy storage device is utilized, are provided according to embodiments of the invention. FIG. 1 shows a high level block diagram of a PAM based polymer electrolyte ZIB configuration according to embodiments of the invention. In particular, the configuration of PAM based polymer electrolyte ZIB 100 illustrated in FIG. 1 comprises cathode 110, PAM based polymer electrolyte 120, and anode 130, wherein PAM based polymer electrolyte 120 may comprise polyacrylamide, its derivatives, and/or its composites.

PAM based polymer electrolyte 120 of embodiments of PAM based polymer electrolyte ZIB 100 is configured to serve as both separator and electrolyte with respect to cathode 110 and anode 130. Accordingly, PAM based polymer electrolyte 120 of embodiments may comprise a PAM based polymer hosting one or more solutions to form a hydrogel electrolyte (e.g., crosslinked polyacrylamide hydrogel electrolyte). In particular, PAM based polymer electrolyte 120 of embodiments is configured as a polyelectrolyte matrix host for the one or more solutions, such as may comprise a neutral solution of zinc sulfate and manganese sulfate, to achieve a stable electro chemical performance under the repetitive deformation conditions. PAM based polymer electrolyte 120 may, for example, comprise a PAM based polymer with divalent zinc salt (e.g., comprising $Zn^{2+}$ ions) forming a hydrogel electrolyte, such as in embodiments where cathode 110 comprises a manganese-dioxide ($MnO_2$) cathode and anode 130 comprises a zinc (Zn) anode. In operation according to embodiments, $MnO_2$ of cathode 110 can reversibly store and release zinc ions ($Zn^{2+}$) in its tunnels during the charging and discharging process of PAM based polymer electrolyte ZIB 100. PAM based polymer electrolyte 120 of embodiments benefits from the good compatibility between metal salts and PAM, and possesses a high ionic conductivity and exceptional strength, which greatly enhances the chargeability of PAM based polymer electrolyte ZIB 100.

PAM based polymer electrolyte ZIB 100 of embodiments is configured to provide a flexible and rechargeable energy-storage device implementation. Accordingly, in addition to a flexible configuration of PAM based polymer electrolyte 120, such as may be provided by the foregoing hydrogel electrolyte configurations, cathode 110 may comprise a flexible cathode configuration and/or anode 130 may comprise a flexible anode configuration. Flexible cathode configurations of cathode 110 may, for example, be composed of a current collector, manganese dioxide ($MnO_2$) powder, conductive additives, binders, and/or the like. A current collector of cathode 110 of embodiments; may comprise any suitable shape and may be made of any conductive material suitable for providing operation as described here. Flexible anode configurations of anode 130 may be composed of a current collector, conductive additives, zinc, zinc alloy, zinc composites, and/or the like. A flexible zinc anode configuration of anode 130 of embodiments may, for example, comprise any suitable shape of zinc, zinc alloy, or zinc composites. It should be appreciated that such flexible and rechargeable implementations of PAM based polymer electrolyte ZIB 100 of embodiments of the invention are well suited for use with respect to next-generation flexible and wearable electronics. In particular PAM based polymer electrolyte ZIB 100 may be utilized to provide a highly wearable, durable, and deformable energy-storage device with excellent electrochemical performance, such as is useful in flexible and wearable electronics applications.

Having generally described configurations of a PAM based polymer electrolyte ZIB in accordance with embodiments herein, example techniques for the preparation of the electrolyte, cathode, and anode thereof are provided. It should be appreciated that the particulars of the example are provided to aid in understanding the concepts of the present invention and are not intended as limiting with respect to PAM based polymer electrolyte ZIBs that may be implemented in accordance with the present disclosure.

In an exemplary technique for the preparation of cross-linked hydrogel of the PAM based polymer electrolyte of embodiments, 2 g Acrylamide monomer powders may be added into 20 g deionized water and stirred for 30 min at 25° C. to fully dissolve. Thereafter, 10 mg potassium persulfate (initiator) and 2 mg N,N'-methylenebisacrylamide (cross-linker) may be added into the above solution and stirred for 1 h at 25° C. The mixed solution may be poured into a stainless steel mold, after degassing the solution in a vacuum chamber, and kept at 50° C. for 4 h to obtain a crosslinked PAM hydrogel via a free-radical polymerization approach. The resulting crosslinked PAM hydrogel may be soaked in 400 mL mixed solution of 2 mol $L^{-1}$ $ZnSO_4$ and 0.1 mol $L^{-1}$ $MnSO_4$ up to 72 h to achieve an equilibrated state of the PAM based polymer electrolyte.

In accordance with an exemplary technique for the preparation of a $MnO_2$ cathode of embodiments, a $MnO_2$/carbon nanotube (CNT) composite may be synthesized by a modified co-precipitation and hydrothermal method. In a typical synthesis run, 0.1 g commercial multi-walled CNT with a diameter of 10~30 nm and a length of 5~10 μm (e.g., Shenzhen Nanotech Port Co., Ltd.,) may be purified by refluxing the as-received sample in nitric acid (e.g., AR grade, 68 wt %, Aladdin) for 6 h at 80° C. The acid-treated CNT may be washed with deionized water several times and finally re-dispersed in 150 deionized water. Thereafter, 2.94 g $Mn(CH_3COO)_2.4H_2O$ (e.g., AR grade, Aladdin) may be added into the above solution under continuous stirring for 0.5 h. The resulting solution may be added drop-wise into an aqueous solution prepared by dissolving 1.27 g $KMnO_4$ (e.g., AR grade, Aladdin) into 80 mL deionized water and stirring for 0.5 h. The mixed solution may then be blended intensively by an ultrasonic mixer for 10 min and transferred to a Teflon-lined autoclave and heated at 120° C. for 12 h. After cooling, the obtained dark brown precipitate may be washed several times by deionized water and dried at room temperature in a vacuum oven for 8 h to finally obtain the $MnO_2$/CNT composite of a $MnO_2$ cathode of embodiments.

In accordance with an exemplary technique for the preparation of a Zn electrode of embodiments, a facile electrochemical deposition method may be performed with respect to a CNT paper substrate. For example, a typical two-electrode setup may be used for Zn electroplating, in which a CNT paper substrate may be used as a working electrode, while a zinc plate (e.g., purity >99.99%, Sigma) may be used as both counter and reference electrode. An aqueous solution containing 1 mol $L^{-1}$ $ZnSO_4$ (e.g., AR grade, Sigma) and 1 mol $L^{-1}$ KCl (e.g., AR grade, Sigma) may be used as the electrolyte. Electroplating may be performed at 10 mA $cm^{-2}$ for 2000 s using an electrochemical workstation (e.g., CHI 760D).

A $MnO_2$ cathode, Zn anode, and PAM based polymer electrolyte produced using the foregoing exemplary techniques may be combined to produce a PAM based polymer electrolyte ZIB of embodiments herein. For example, the $MnO_2$ cathode may be encapsulated with a portion of the PAM based polymer electrolyte and the Zn anode may likewise be encapsulated with a portion of the PAM based polymer electrolyte, wherein the encapsulated $MnO_2$ cathode and encapsulated Zn anode may be disposed adjacent to each other to form an embodiment of PAM based polymer electrolyte ZIB 100.

A high-performance waterproof, tailorable, and stretchable configuration of PAM based polymer electrolyte ZIB 100 may be provided using a PAM based polymer electrolyte (e.g., cross-linked polyacrylamide hydrogel electrolyte) of embodiments herein in combination with multiple helix yarn electrodes configured to improve electrolyte wetting of the electrode surface, wherein CNT yarn may be used as substrates for anode 110 and cathode 130 to enhance the strength and robustness of the electrodes under different deformation conditions. For example, cathode 110 and anode 130 of PAM based polymer electrolyte ZIB 100 may be comprised of CNT yarn (e.g., $MnO_2$ coated CNT yarn providing cathode 110 and Zn coated CNT yarn providing anode 130) disposed in a double helix about PAM based polymer electrolyte 120 to provide a solid-state yarn ZIB implementations. The helix structured electrodes of embodiments benefit from the high ionic conductivity of PAM based polymer electrolyte 120 and high loading of $MnO_2$ nanorods in the helix structured electrodes to deliver a high specific energy density (e.g., 302.1 mAh $g^{-1}$) and volumetric energy density (e.g., 53.8 mWh $cm^{-3}$) and provide excellent cycling stability (e.g., 98.5% capacity retention after 500 cycles). Moreover, such a solid-state yarn configuration of PAM based polymer electrolyte ZIB 100 demonstrates superior knitability, good stretchability (e.g., up to 300% strain), and excellent waterproof ability (e.g., high capacity retention of 96.5% after 12 hours of continuous underwater operation), which are is well suited for flexible and wearable applications. Furthermore, the solid-state yarn configuration of embodiments of PAM based polymer electrolyte ZIB 100 may be tailored (e.g., cut) into various lengths, wherein each such length of the PAM based polymer electrolyte ZIB functions well.

Figure 2:
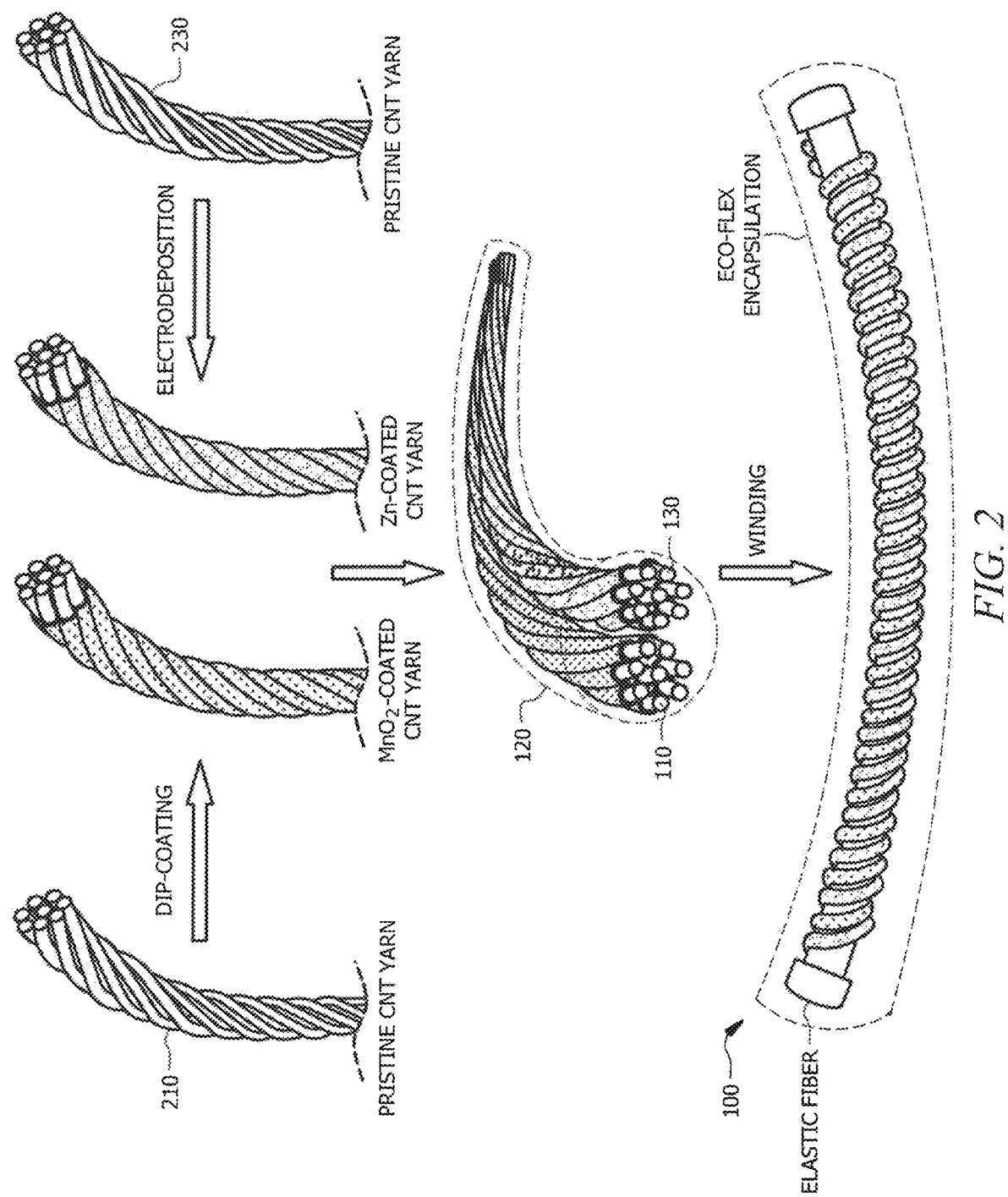
FIG. 2 illustrates coating of carbon nanotube (CNT) substrates with material to provide cathode and anode electrodes, and their encapsulation in PAM based polymer electrolyte to form a PAM based polymer electrolyte ZIB of embodiments of the present invention.
Figure 3A:
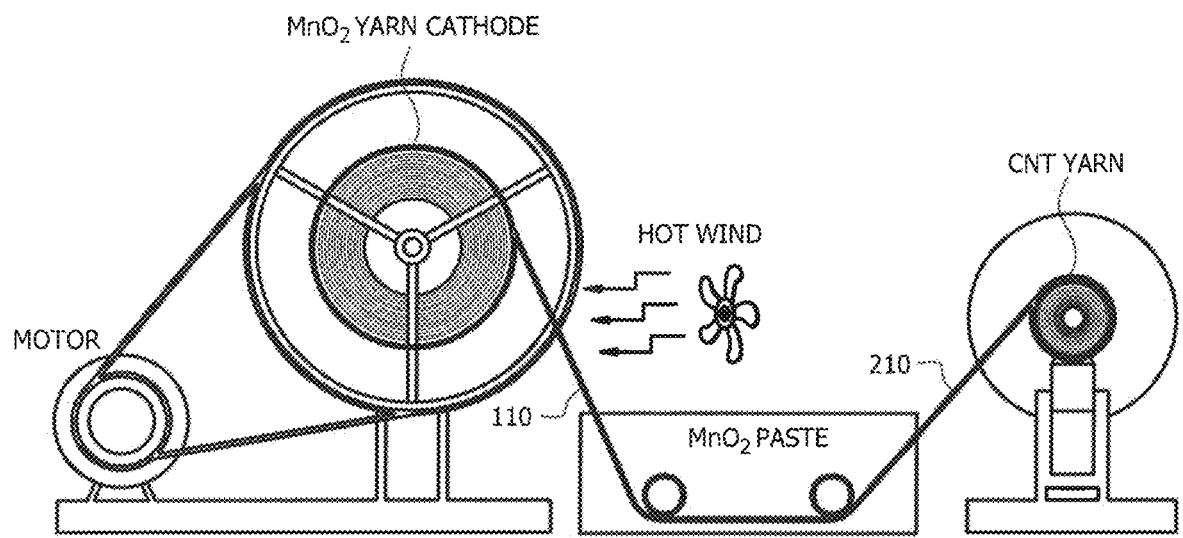
FIGS. 3A and 3B illustrate fabrication processes facilitating production of large scale continuous CNT yarn as may be used as electrodes of a PAM based polymer electrolyte ZIB of embodiments of the present invention.

FIGS. 2, 3A, and 3E illustrate an exemplary fabrication process as may be utilized in producing embodiments of a solid-state yarn configuration of PAM based polymer electrolyte ZIB 100. In particular, FIG. 2 illustrates coating of CNT yarn 210 with a manganese dioxide material (e.g., $MnO_2$ powder) to provide a yarn configured for use as cathode 110, coating of CNT yarn 230 with a Zn material (e.g., zinc, zinc alloy, and/or zinc composites) to provide a yarn configured for use as anode 130, and encapsulation of each of cathode 110 and anode 130 in PAM based polymer electrolyte 120 to form a solid-state yarn configuration of PAM based polymer electrolyte ZIB 100. The embodiment of PAM based polymer electrolyte ZIB 100 illustrated in FIG. 2 comprises the yarns of cathode 110 and anode 130 disposed in a double helix configuration about a central elastic fiber (e.g., long rubber band, elastic heat-shrink tube, etc.) structure for improved resiliency and structural integrity of the helix configuration. Additionally, the embodiment of PAM based polymer electrolyte ZIB 100 illustrated in FIG. 2 is encapsulated with a thin layer of a resilient membrane (e.g., Eco-flex silicone or other silicone coating) and/or water repellent (e.g., fluoropolymer) to render the PAM based polymer electrolyte ZIB waterproof or water resistant, while maintaining stretchability.

Figure 3B:
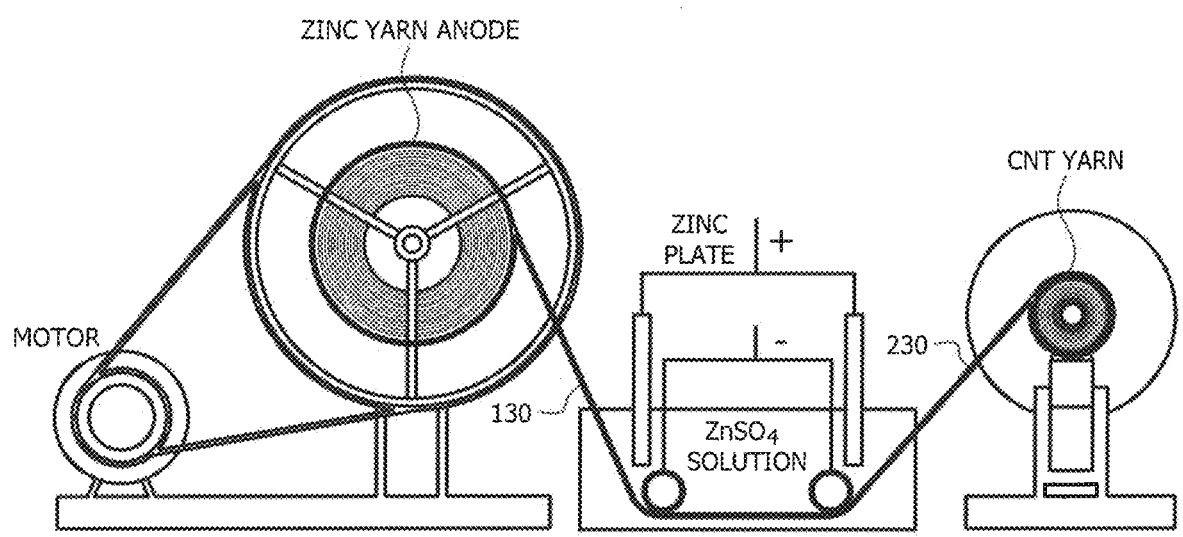

FIGS. 3A and 3B illustrate fabrication processes facilitating production of large scale continuous CNT yarn, such as may be well suited for production of solid-state yarn configurations of PAM based polymer electrolyte ZIBs that are to be integrated into modern textile industry for practical application. In particular, FIG. 3A shows a roll-dip-coating process for producing the $MnO_2$ yarn of cathode 110 and FIG. 3B shows a roll-electro deposition process for producing the zinc yarn of anode 130, wherein each provides a continuous and facile process to coat the CNT fibers. For example, in operation according to the processes of FIGS. 3A and 3B, after cleaning with deionized (DI) water and ethanol, a plurality of aligned CNT fibers (e.g., 8 aligned CNT fibers) may be twisted to provide CNT yarn (e.g., CNT yarn 210 and/or CNT yarn 230). In operation according to the exemplary process of FIG. 3A, CNT yarn 210 may be passed, such as by being drawn by a motor, through a vessel filled with pre-dispersed $MnO_2$ paste. For example, the motor drawing CNT yarn 210 through the vessel may steadily rotate at a slow rate (e.g., 0.1 $cms^{-1}$) so that a thin layer of $MnO_2$ paste may be coated uniformly on the surface of the CNT fibers. In operation according to the exemplary process of FIG. 3B, CNT yarn 230 may be passed, such as by being drawn by a motor, through a vessel filled with a zinc solution (e.g., $ZnSO_4$) for electrodeposition of zinc material upon the fibers of the yarn. For example, the motor drawing CNT yarn 230 through the vessel may steadily rotate at a slow rate (e.g., 0.1 $cms^{-1}$) while stainless steel rods and zinc foils in the vessel are connected to the electrochemical station (e.g., CNT yarn 230 may be guided through the vessel near the rods/foils) so that a thin layer of zinc material may be coated uniformly on the surface of the CNT fibers. Thereafter, the $MnO_2$ coated yarn providing cathode 110 and the zinc coated yarn providing anode 130 may be wound onto an elastic fiber in parallel (as shown in FIG. 2), and a thin layer of PAM based polymer electrolyte 120 (e.g., as may be produced in accordance with the exemplary technique described above) may be coated on and between the two electrodes. For example, the $MnO_2$ coated yarn providing cathode 110 may be dipped or otherwise immersed into PAM based polymer electrolyte 120 to encapsulate the material of cathode 110 in PAM based polymer electrolyte 120. Similarly, the zinc coated yarn providing anode 130 may be dipped or otherwise immersed into PAM based polymer electrolyte 120 to encapsulate the material of anode 130 in PAM based polymer electrolyte 120. After the electrolyte coatings have been allowed to solidify, cathode 110, encapsulated in PAM based polymer electrolyte 120, may be twined around anode 130, also encapsulated in PAM based polymer electrolyte 120, to form a helical structure. The resulting PAM based polymer electrolyte ZIB may be encapsulated with a resilient membrane and/or water repellent to provide water resistance as well as further structural integrity.

Figure 4:
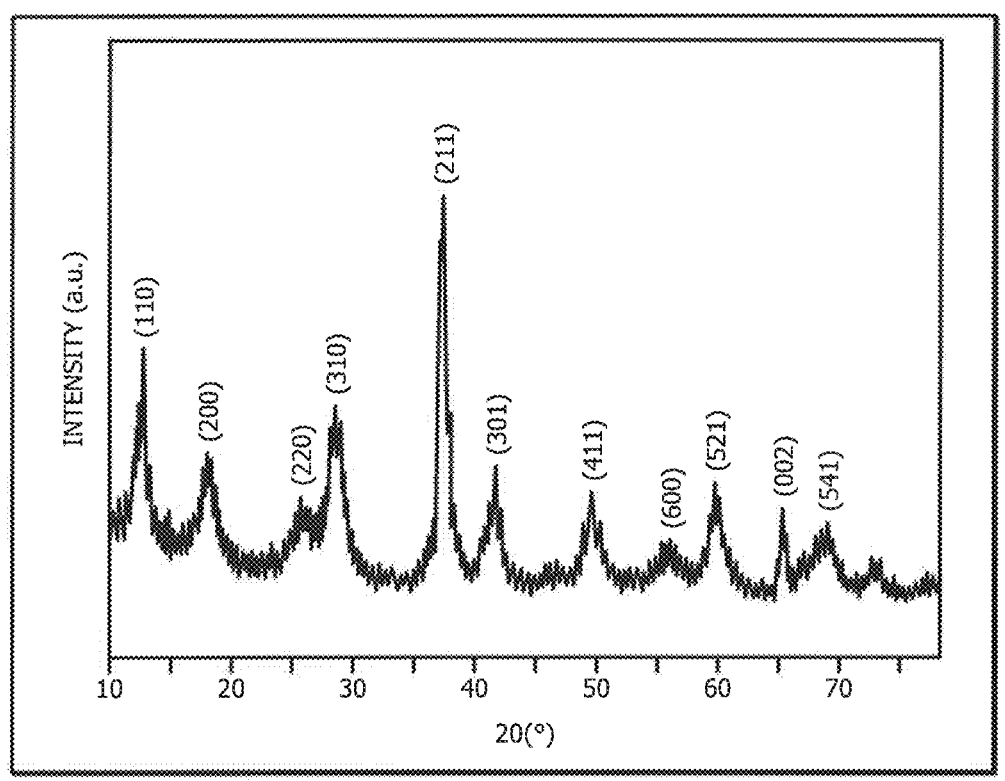
FIG. 4 shows the crystalline phase of a MnO$_2$/CNT composite of a cathode as may be used in embodiments of a PAM based polymer electrolyte ZIB of the present invention.

The X-ray diffraction (XRD) pattern for a CNT yarn implementation of cathode 110 produced in accordance with the foregoing process is shown in FIG. 4. In particular, FIG. 4 shows the crystalline phase of the $MnO_2$/CNT composite of embodiments, wherein it can be seen that the diffraction peaks are well-indexed to the characteristic peaks of $\alpha$-MnO$_2$.

From analysis of scanning electron microscopy (SEM) images of examples of CNT yarn prepared in accordance with the foregoing example processes, in which the CNTs are highly aligned, it was found that the sample CNT fiber has an average diameter of approximately 30 μm and a relatively compact structure. Further analysis of SEM images of examples of the CNT yarn show the morphology of the CNT yarn configuration of the zinc anode comprise rock-like zinc deposits in discrete assemblies that are uniformly coated on the surface of CNT yarn, wherein layer-by-layer growth of zinc on individual deposits can be observed. Analysis of SEM images of the CNT yarn configuration of the MnO$_2$ cathode reveals that MnO$_2$ paste was homogeneously coated on the surface of CNT fibers, wherein the MnO$_2$ nanorods were observed to be approximately 30 nm wide with lengths ranging from 100 to 300 nm. Acid-treated CNTs with external diameters of 10-30 nm were also observed uniformly dispersed among MnO$_2$ nanorods. Analysis of high-resolution transmission electron microscopy (HRTEM) images show one-dimensional $\alpha$-MnO$_2$ nanorods with a lattice distance of 0.685 nm for the (110) plane, revealing that as-prepared MnO$_2$ nanorods are highly crystalline, with the (110) axis as the preferred orientation.

Figure 5A:
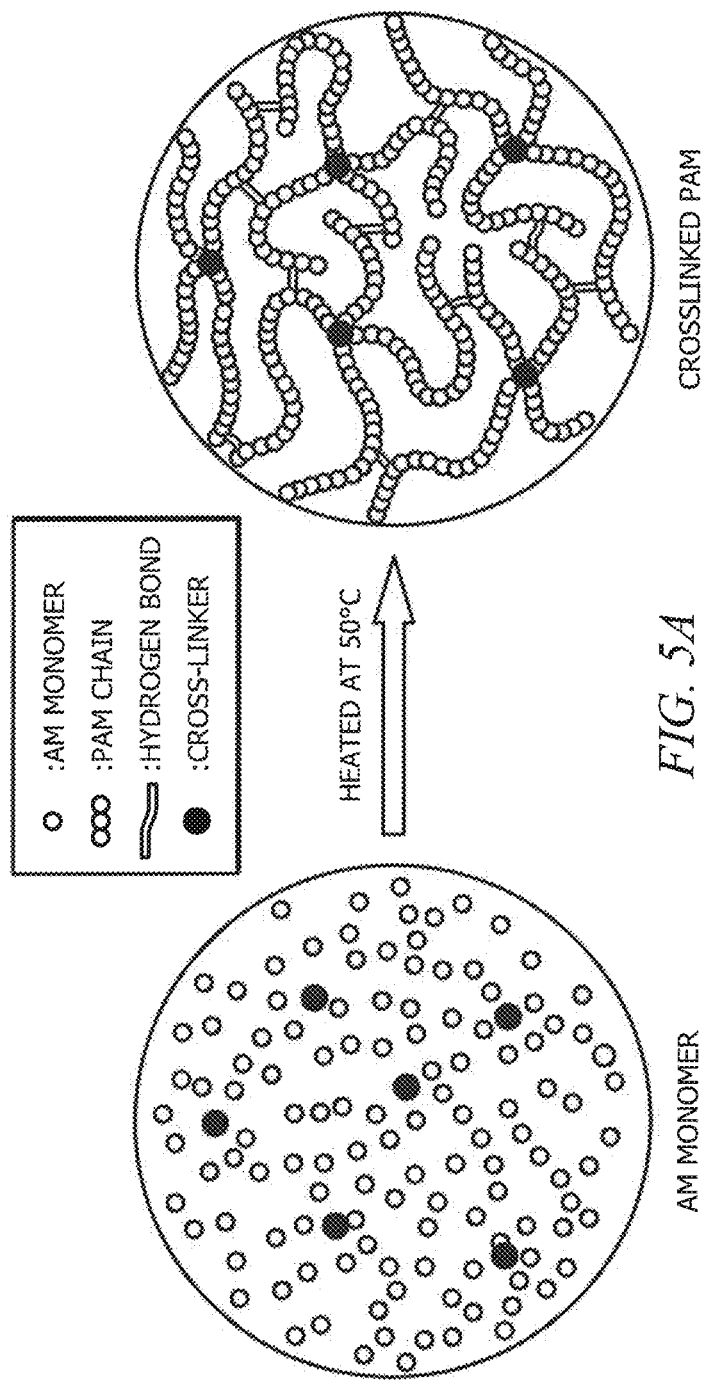
FIG. 5A shows the polyacrylamide chains of a PAM based polymer electrolyte of embodiments forming a network by covalent crosslinks and hydrogen bonds.

The PAM based polymer electrolyte produced in accordance with embodiments of the invention preferably comprise a crosslinked polyacrylamide hydrogel electrolyte. The polyacrylamide chains of such a PAM based polymer electrolyte form a network by covalent crosslinks and hydrogen bonds as illustrated in FIG. 5A. In producing a crosslinked polyacrylamide hydrogel electrolyte configuration of a PAM based polymer electrolyte, acrylamide (AM, main monomer) powders may be dissolved in deionized water, followed by adding potassium persulfate as an initiator, and N,N'-methylenebisacrylamide as a cross-linker for polyacrylamide, respectively. After degassing the solution in a vacuum chamber, the mixed solution may be kept at 50° C. for 2 h and a crosslinked PAM hydrogel may be obtained through a free-radical polymerization approach. The resulting crosslinked PAM hydrogel may be soaked in a mixed solution of ZnSO$_4$ (2M) and MnSO$_4$ (0.1M) to absorb significant amounts of water and anions to ensure a good ionic conductivity.

Figure 5B:
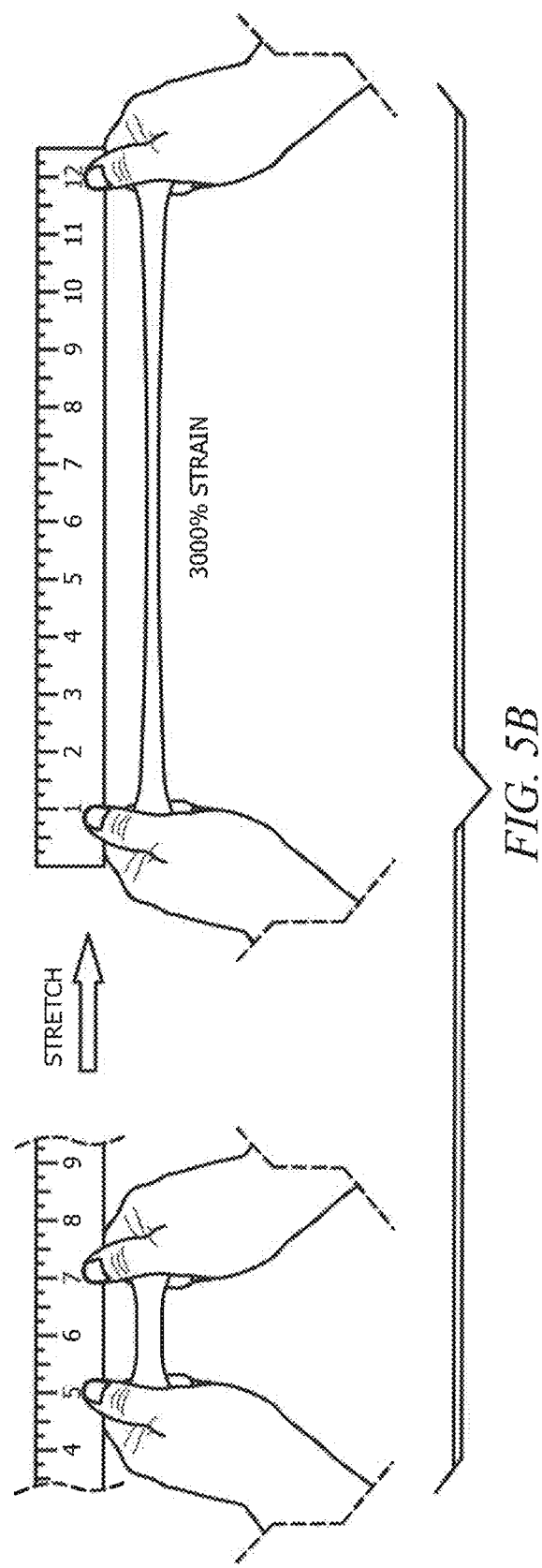
FIG. 5B illustrates the tensile strength of a crosslinked polyacrylamide hydrogel electrolyte configuration of a PAM based polymer electrolyte prepared in accordance with embodiments of the present invention.
Figure 5C:
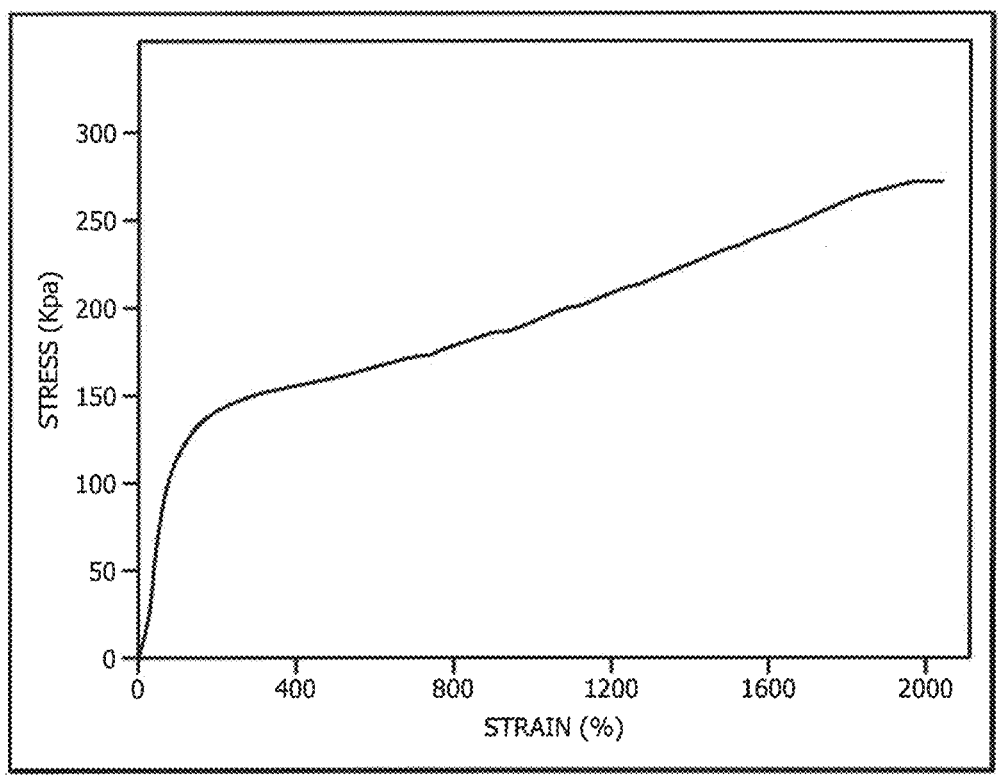
FIG. 5C illustrates the stretchability of a crosslinked polyacrylamide hydrogel electrolyte configuration of a PAM based polymer electrolyte prepared in accordance with embodiments of the present invention.
Figure 5D:
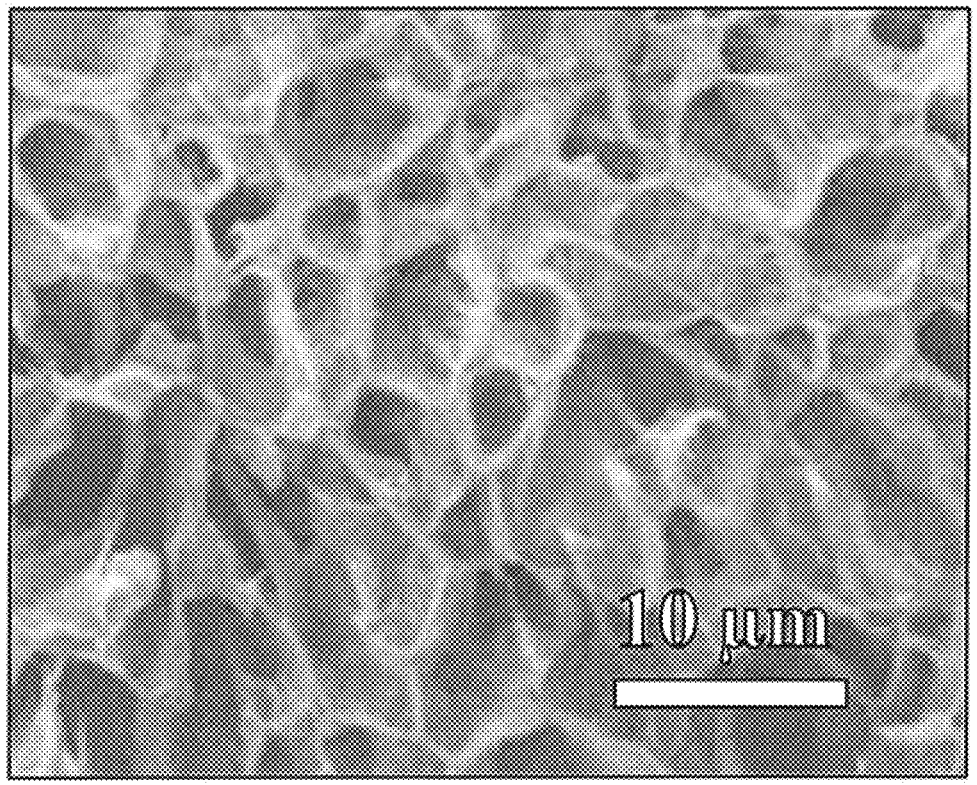
FIG. 5D show a SEM image of a freeze dried sample of a PAM based polymer electrolyte of embodiments of the present invention.
Figure 5E:
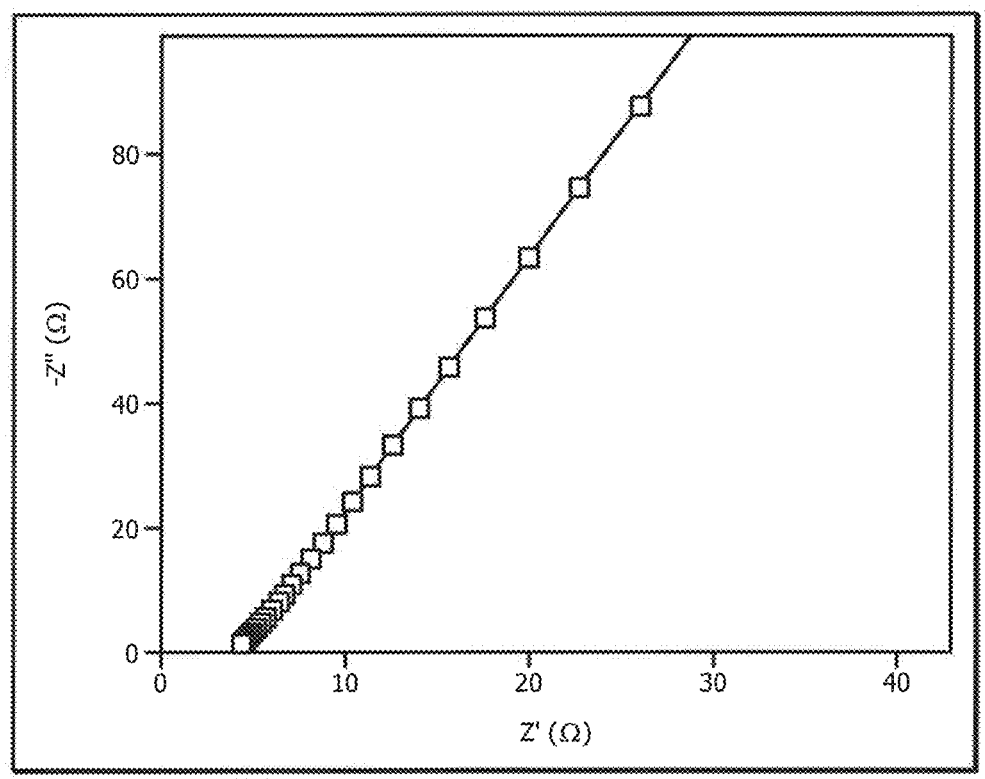
FIG. 5E illustrates the ionic conductivity of an example crosslinked polyacrylamide hydrogel electrolyte configuration of a PAM based polymer electrolyte prepared in accordance with embodiments of the present invention.

A crosslinked polyacrylamide hydrogel electrolyte configuration of a PAM based polymer electrolyte prepared in accordance with the foregoing shows good tensile strength (e.g., 273 kPa) and high stretchability to 3000% strain, as illustrated in FIGS. 5B and 5C. Accordingly, this exemplary PAM based polymer electrolyte is highly stretchable and has good mechanical properties. From analysis of SEM images of freeze dried samples of the PAM based polymer electrolyte of this example, it can be seen that the PAM shows a highly porous network structure of the polymer matrix, as shown in FIG. 5D, which is beneficial for trapping water and free movement of zinc ions, endowing a good ionic conductivity. The ionic conductivity of the example crosslinked polyacrylamide hydrogel electrolyte configuration of a PAM based polymer electrolyte prepared in accordance with the above process, as may be obtained from the AC impedance spectra, shows a high ionic conductivity of $17.3 \times 10^{-3}$ S$^{-1}$ at room temperature as shown in FIG. 5E. Such a high ionic conductivity can be attributed to the presence of highly porous network structure in the polymer matrix for zinc ions to move freely as well as a large number of hydrophilic groups such as amide groups (—CONH$_2$).

Figure 5F:
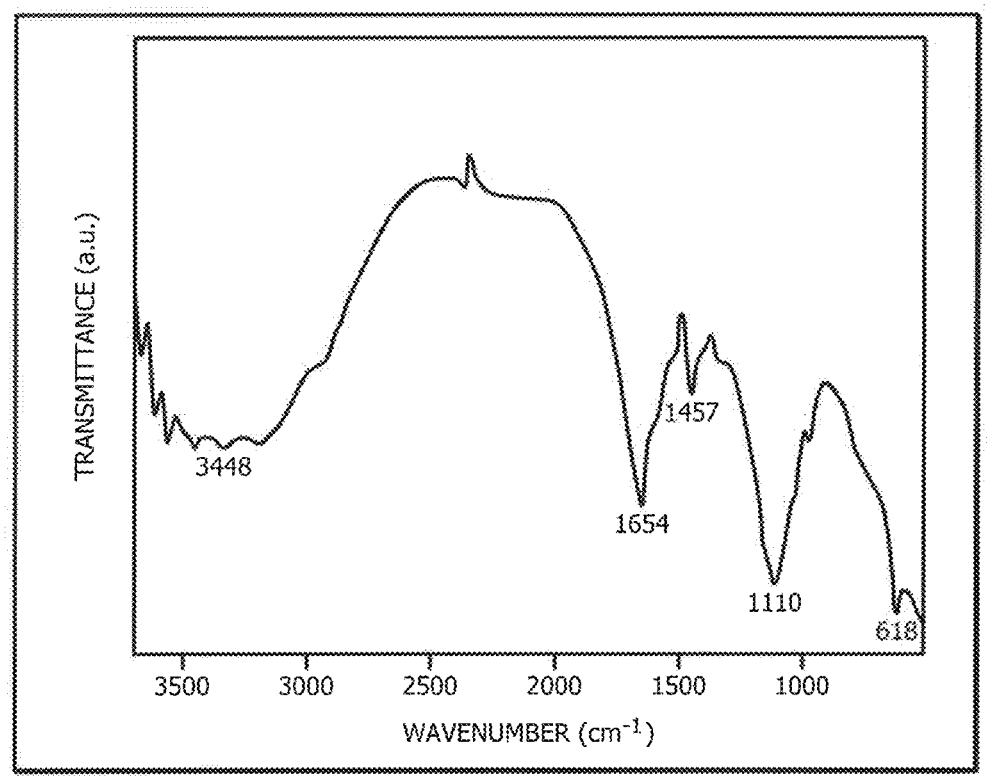
FIG. 5F shows Fourier-transform infrared spectrum (FTIR) analysis of pristine PAM as may be used in the PAM based polymer electrolyte of embodiments of the present invention.

The polymerization mechanism of the foregoing exemplary PAM based polymer electrolyte may be studied using Fourier-transform infrared spectrum (FTIR) analysis. The spectrum of the pristine PAM is shown in FIG. 5F, wherein several typical absorption bands of PAM are present at 3448 cm$^{-1}$ (N—H stretching vibration), 1654 cm$^{-1}$ (amide I, C=O stretching vibration), and 1541 cm$^{-1}$ (amide II, N—H bending vibration). Other absorption bands are present in the FTIR spectrum of FIG. 5F at 1457 cm$^{-1}$, 1100 cm$^{-1}$, and 618 cm$^{-1}$, which are attributed to CH$_2$ scissoring, C—O stretching vibration, and N—H wagging vibration, respectively.

Figure 6A:
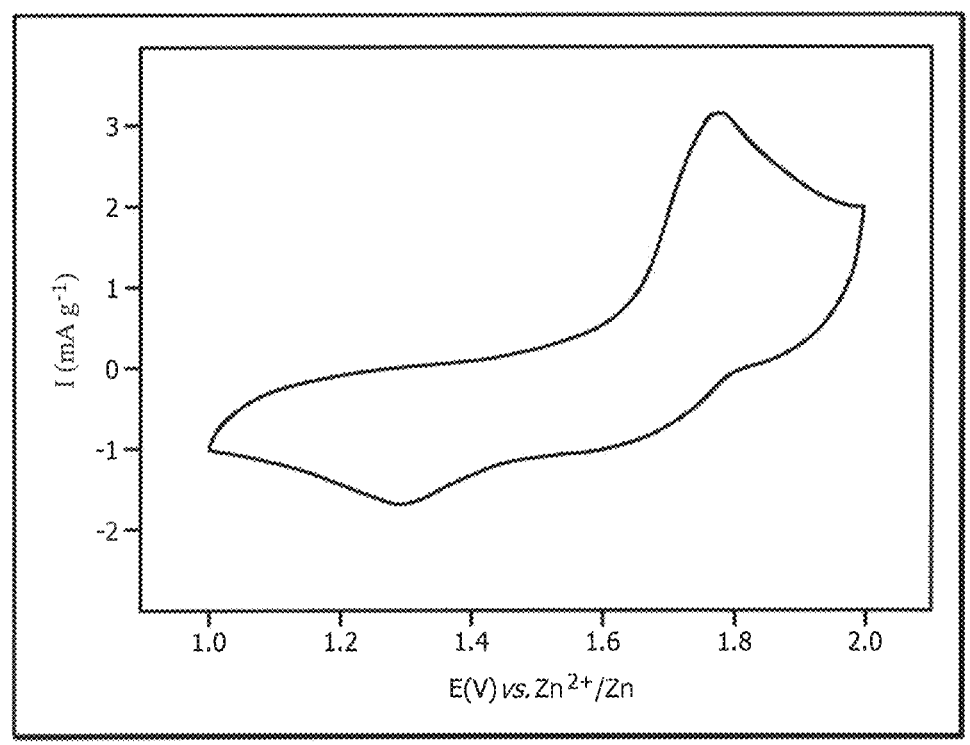
FIG. 6A shows the CV curve for an exemplary solid-state yarn configuration of PAM based polymer electrolyte ZIB of embodiments of the present invention.

The electrochemical properties of a solid-state yarn configuration of PAM based polymer electrolyte ZIB produced from CNT yarns and PAM based polymer electrolyte provided in accordance with processes described above may be evaluated by cyclic voltammetry (CV) measurements and galvanostatic charge/discharge tests. The CV curve for an exemplary solid-state yarn configuration of PAM based polymer electrolyte ZIB, obtained at a sweep rate of 2 mV·s$^{-1}$ within the potential range of 1.0V~2.0V vs. Zn/Zn$^{2+}$, is shown in FIG. 6A. As can be seen in the curve illustrated in FIG. 6A, two distinct peaks are observed at around 1.75 V and 1.3 V, indicating that only one well-defined oxidation-reduction reaction appears in the charge/discharge process. The redox couples, at around 135 V and 1.3 V, should be attributed to the extraction/insertion of Zn$^{2+}$ ions into/from the tunnel of MnO$_2$ crystals, respectively.

Figure 6B:
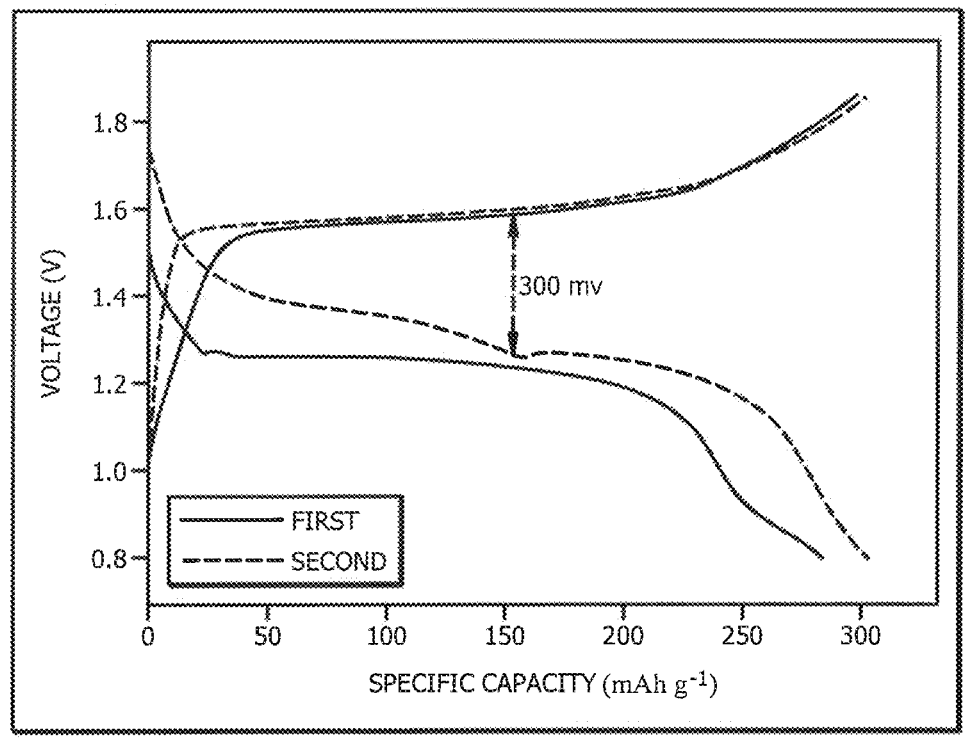
FIG. 6B shows the first and second charge/discharge curves of an exemplary solid-state yarn configuration of PAM based polymer electrolyte ZIB of embodiments of the present invention.

The first and second charge/discharge curves of the exemplary solid-state yarn configuration of PAM based polymer electrolyte ZIB at a current of 60 mAg$^{-1}$ are shown in FIG. 6B. As can be appreciated from the charge/discharge curves of FIG. 6B, the exemplary solid-state yarn configuration of PAM based polymer electrolyte ZIB delivers reversible capacities of 283.6 and 302.1 mAh g$^{-1}$ at 60 mAg$^{-1}$ in the initial two cycles, which are much higher than reported with respect to prior attempts at providing rechargeable Zn—MnO$_2$ battery configurations (see C. J. Xu et al., "Energetic zinc ion chemistry: the rechargeable zinc ion battery," *Angew. Chem. Int. Ed.*, 2012, 51, 933-935, B. Lee et al., Electrochemically-induced reversible transition from the tunneled to layered polymorphs of manganese dioxide, *Sci. Rep.*, 2014, 4, 6066-6074, M. H. Alfaruqi, J. Gim, S. Kim, et al., "A layered δ-MnO$_2$ nanoflake cathode with high zinc-storage capacities for eco-friendly battery applications," *Electrochem. Commun.*, 2015, 60: 121-125, and M. H. Alfaruqi, V. Mathew, J. Gim, et al., "Electrochemically induced structural transformation in a γ-MnO$_2$ cathode of a high capacity zinc-ion battery system," *Chem. Mater.*, 2015, 27, 3609-3620). Moreover, the highest energy density of the exemplary solid-state yarn configuration of PAM based polymer electrolyte ZIB reached 53.8 mWh cm$^{-3}$ based on the volume of the two electrodes, which is approximately 7-times that of Ni—Zn batteries (7.76 mWh cm$^{-3}$) (see J. Liu, C. Guan, C. Zhou, Z. Fan, Q. Ke, G. Zhang, C. Liu, and J. Wang, "A flexible quasi-solid-state nickel-zinc battery with high energy and power densities based on 3D electrode design," *Adv. Mater.*, 2016, 28, 8732, the disclosure of which is incorporated herein by reference) and three times than that of commercial thin-film lithium-ion batteries (10 mWh cm$^{-3}$) (see D. Pech, M. Brunet, H. Durou, P. Huang, V. Mochalin, Y. Gogotsi, P. L. Taberna, P. Simon, "Ultrahigh-power micrometer-sized supercapacitors based on onion-like carbon," *Nat. Nanotechnol.*, 2010, 5, 651-654, the disclosure of which is incorporated herein by reference).

It can be seen in the charge/discharge curves of FIG. 6B that the exemplary solid-state yarn configuration of PAM based polymer electrolyte ZIB shows rather different charge/discharge curves for the initial two charge/discharge cycles. The plateau observed at 1.3 V in the discharge profiles may be attributed to zinc insertion into the $MnO_2$ cathode. This observation is consistent with the CV results shown in FIG. 6A.

Figure 6C:
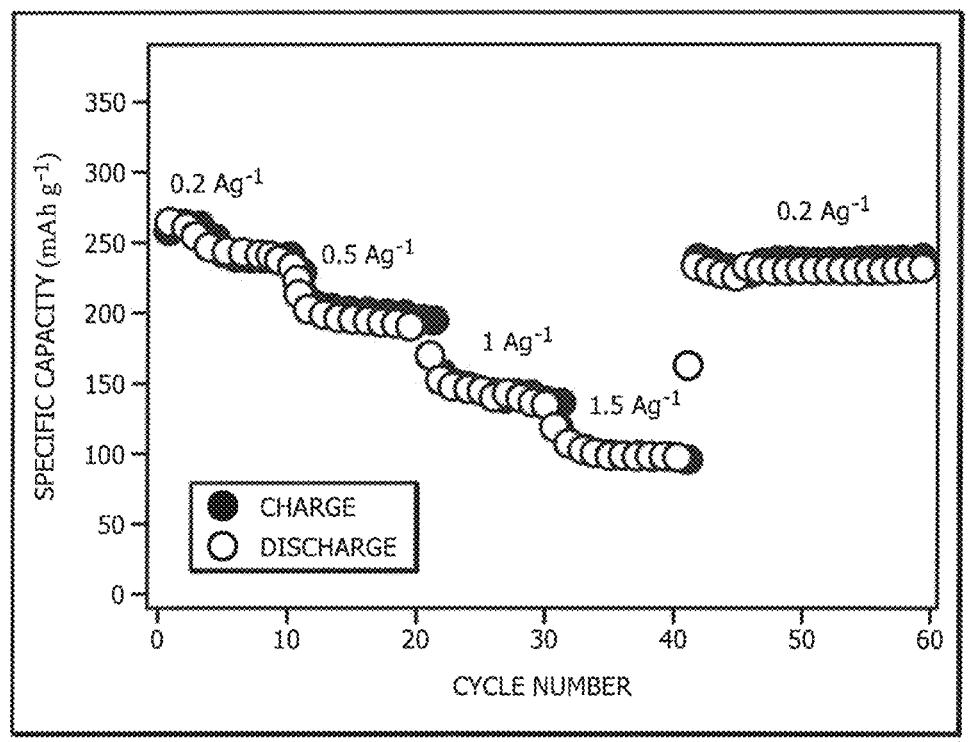
FIG. 6C illustrates measured results for an exemplary solid-state yarn configuration of PAM based polymer electrolyte ZIB of embodiments of the present invention.

The rate performance of a PAM based polymer electrolyte ZIB may be analyzed using measurements at various current densities. FIG. 6C illustrates measured results for the exemplary solid-state yarn configuration of PAM based polymer electrolyte ZIB at various current densities ranging between 0.2 and 1.5 $Ag^{-1}$ by cycling it ten times at each rate. As can be seen by the graphs of FIG. 6C, the exemplary solid-state yarn configuration of PAM based polymer electrolyte ZIB exhibits high discharge capacities of 260.4, 211.5, 168.7, and 117.7 $mAhg^{-1}$ at current densities of 0.2 $Ag^{-1}$, 0.5 $Ag^{-1}$, 1 $Ag^{-1}$ and 1.5 $Ag^{-1}$, respectively. After being cycled at current densities as high as 1.5 $Ag^{-1}$, an average discharge capacity of 235.8 $mAhg^{-1}$ is still recovered at a current density of 0.2 $Ag^{-1}$, that is equivalent to 96.5% of the initial average capacity (244.3 $mAhg^{-1}$). The high rate performance could be ascribed to the stabilization of the electrodes and the high ionic conductivity of the PAM based electrolyte.

Figure 6D:
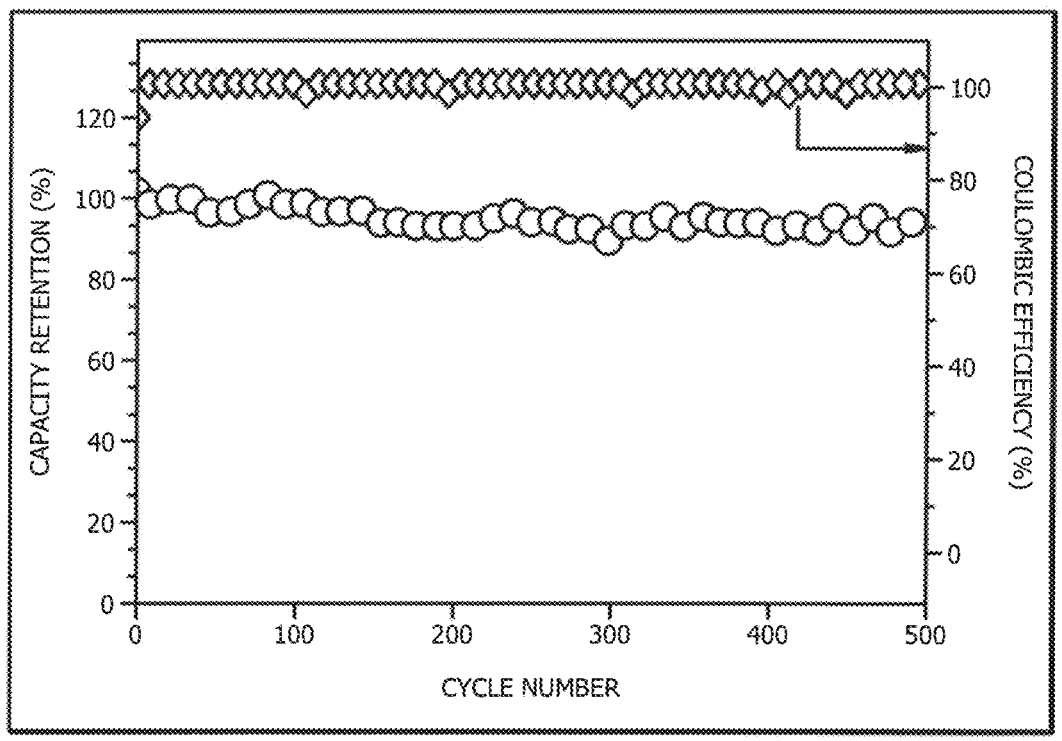
FIG. 6D illustrates the long-term cycling stability of PAM based polymer electrolyte ZIBs of embodiments of the present invention.

In addition to the above noted significant specific energy density characteristics, PAM based polymer electrolyte ZIBs of embodiments herein also show excellent long-term cycling stability. For example, as shown in the graph of FIG. 6D, the exemplary solid-state yarn configuration of PAM based polymer electrolyte ZIB exhibits capacity retention of 98.5%, even after 500 cycles at a large current density of 2 $Ag^{-1}$. This excellent long-term cycling performance may be attributable to several factors: (1) The high water holding capacity and highly porous network of the PAM based polymer electrolyte used in accordance with concepts herein can effectively trap a large amount of water in matrix and hinder the water volatilization, which results in a high ionic conductivity and fast reaction kinetic throughout the long-term charge/discharge test; (2) The superior reactivity and interfacial stability between the PAM based polymer electrolyte and the electrodes of the ZIB significantly lower the interfacial resistance during long-term charge/discharge cycles, which are of great importance for the cycling stability of a PAM based polymer electrolyte ZIB (see the electrochemical impedance spectra analysis discussed below with respect to FIG. 7); and/or (3) The well-dispersed CNTs in the $MnO_2$/CNT composite of a solid-state yarn configuration of PAM based polymer electrolyte ZIB effectively enhance the electron transfer efficiency of the $MnO_2$ yarn cathode, which further improves the cycling stability of current density of 0.2 $Ag^{-1}$.

Figure 7:
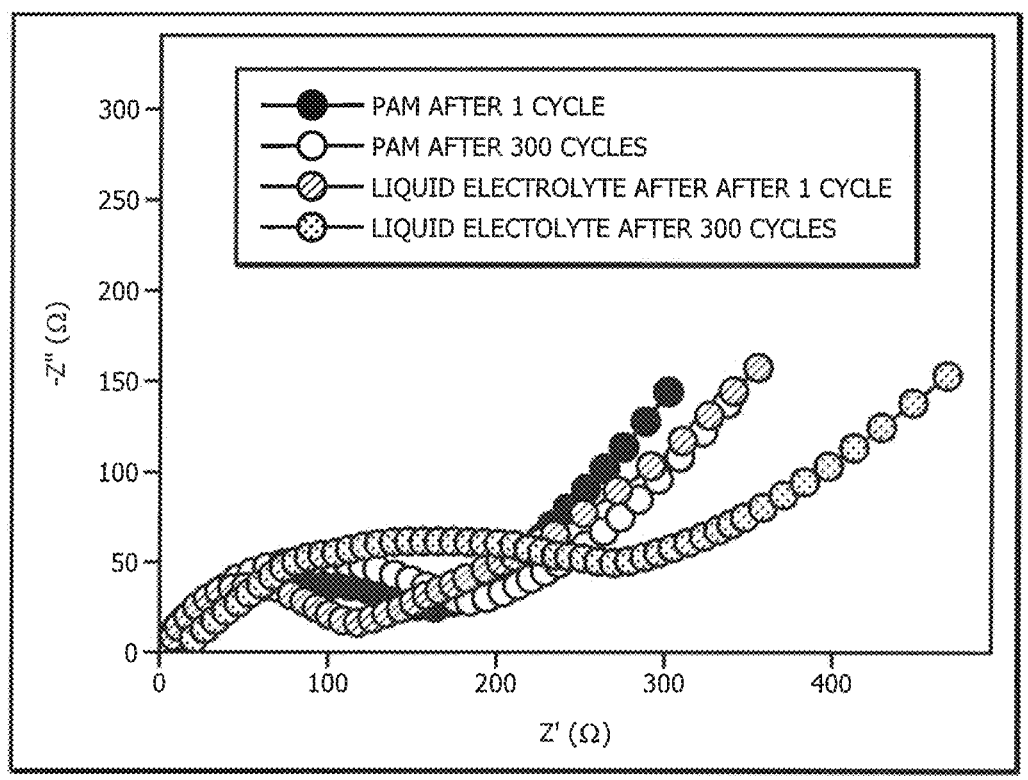
FIG. 7 shows the electrochemical impedance spectra (EIS) of a solid-state yarn configuration of PAM based polymer electrolyte ZIB of embodiments of the present invention compared with the EIS of a ZIB having traditional liquid electrolyte.

FIG. 7 shows the electrochemical impedance spectra (EIS) of a solid-state yarn configuration of PAM based polymer electrolyte ZIB of embodiments herein compared with the EIS of a ZIB having traditional liquid electrolyte. In particular, FIG. 7 shows EIS for the aforementioned batteries after one cycle and 300 cycles at 2 $Ag^{-1}$, as measured at half charge state. In the graphs of FIG. 7, the intersection of the EIS diagram with the real axis at high frequency signifies the bulk resistance of the electrochemical system ($R_b$), while the amplitude of the depressed semicircle represents the interfacial resistance between the electrolyte and electrodes ($R_i$). As can be seen in FIG. 7, the interfacial resistance of the solid-state yarn configuration of PAM based polymer electrolyte ZIB shows little difference after 300 cycles, while the interfacial resistance of the ZIB having traditional liquid electrolyte (2 mol $L^{-1}$ $ZnSO_4$ and 0.1 mol $L^{-1}$ $MnSO_4$) increases significantly. The little variance in interfacial resistance indicates the interface between the PAM based polymer electrolyte and electrodes keeps steady during charge/discharge cycles, contributing to the outstanding cycling performance of a solid-state yarn configuration of PAM based polymer electrolyte ZIB of embodiments herein (see FIG. 6D discussed above).

Figure 8A:
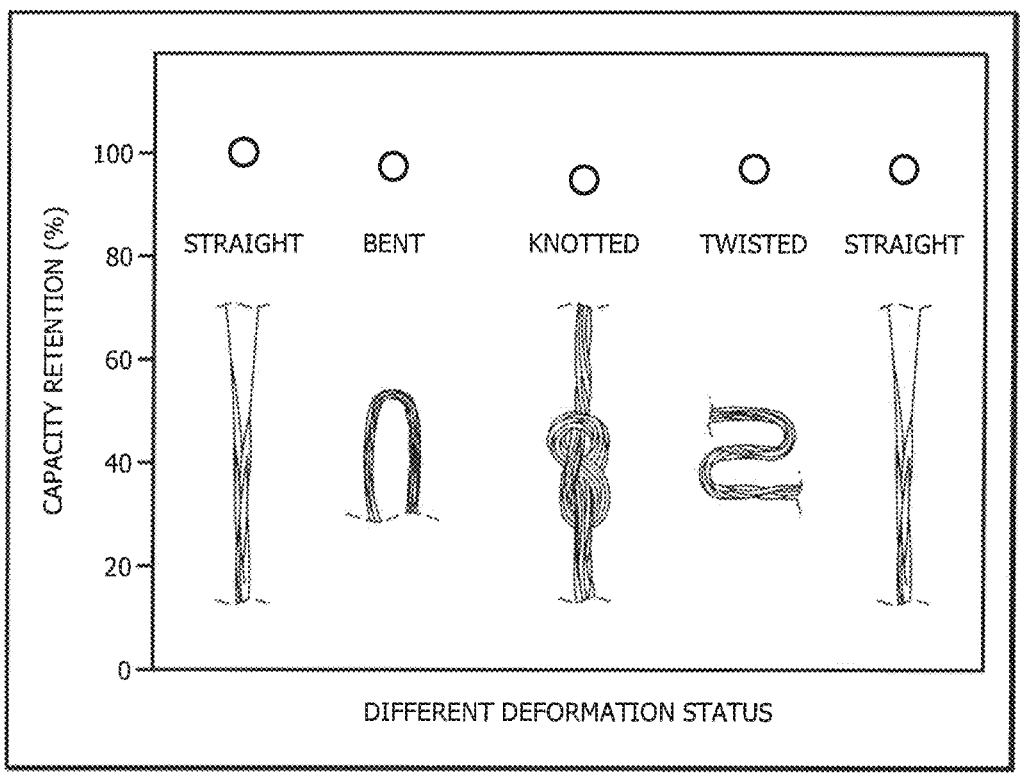
FIG. 8A illustrates the capacity retention of an exemplary solid-state yarn configuration of PAM based polymer electrolyte ZIB of embodiments of the present invention.
Figure 8B:
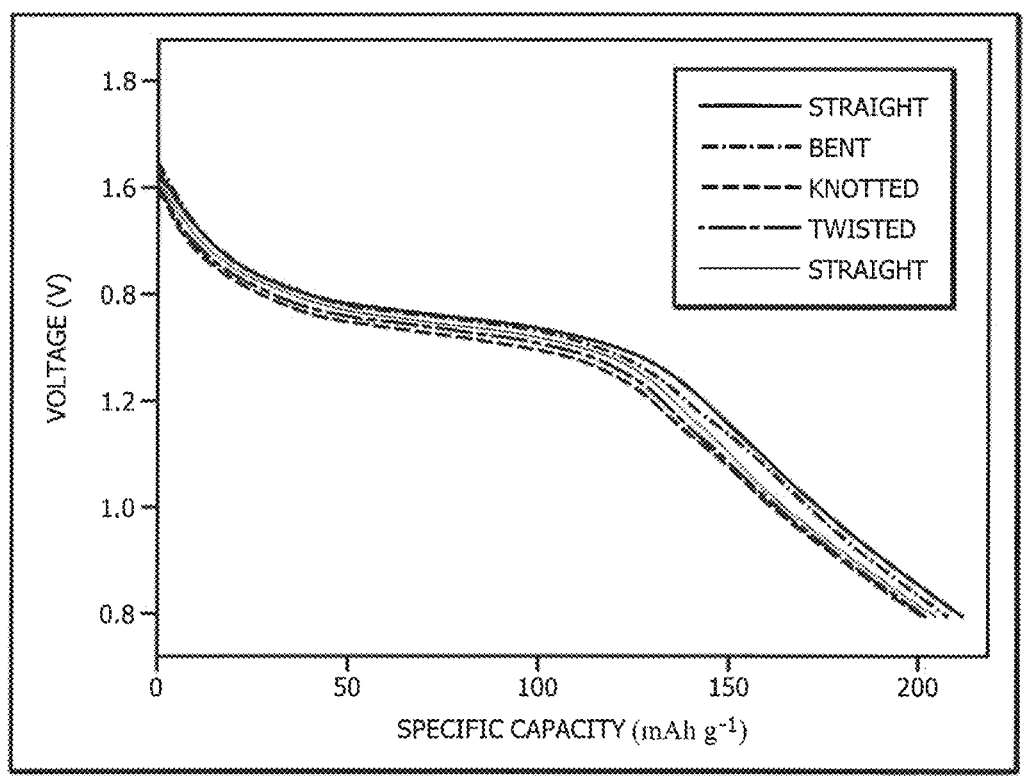
FIG. 8B shows the discharge curves of an exemplary solid-state yarn configuration of PAM based polymer electrolyte ZIB of embodiments of the present invention.

Solid-state yarn configuration of PAM based polymer electrolyte ZIBs produced in accordance with the concepts herein were subjected to a continuous deformation test to evaluate the durability and stability of a PAM based polymer electrolyte ZIB of embodiments under different deformation conditions. As can be seen in FIG. 8A, the capacity retention of the exemplary solid-state yarn configuration of PAM based polymer electrolyte ZIB remains above 95% under various deformation statuses in the order of being bent, knotted, and twisted. After the foregoing nonplanar deformation tests, the solid-state yarn configuration of PAM based polymer electrolyte ZIB was recovered back to its original shape, wherein it was observed that over 96.5% of initial capacity remained. In particular, FIG. 8B, showing the discharge curves of the exemplary solid-state yarn configuration of PAM based polymer electrolyte ZIB under different deformation statuses, shows that the solid-state yarn configuration of PAM based polymer electrolyte ZIB maintains high capacity when returned to its original strait shape.

Figure 8C:
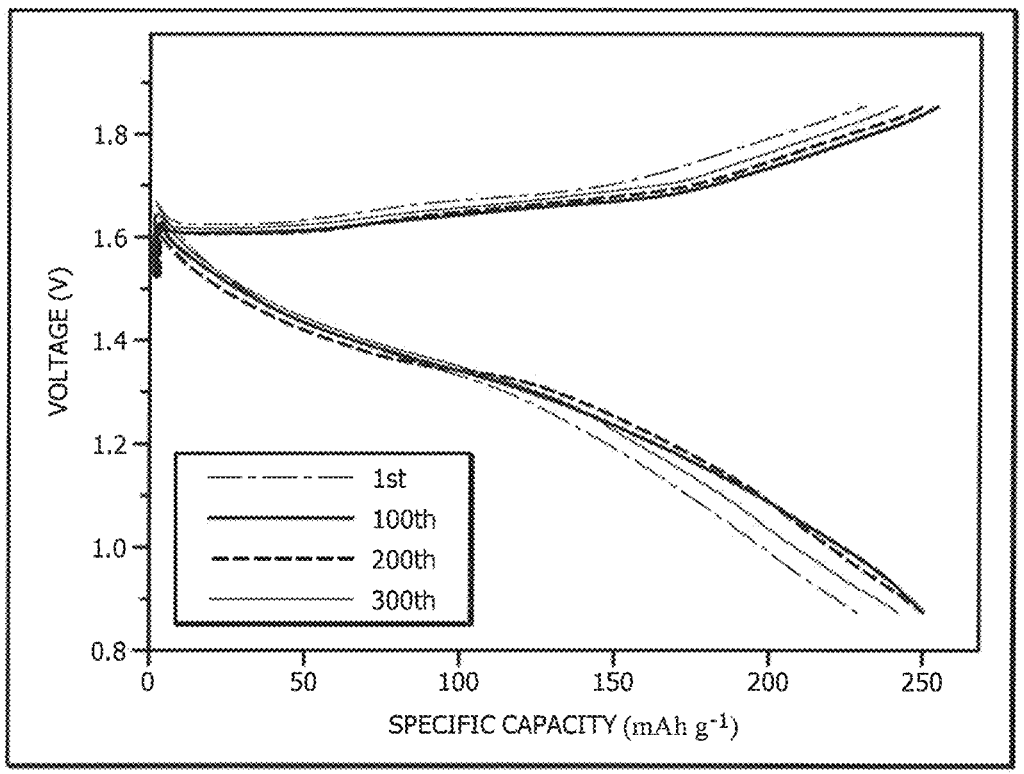
FIG. 8C illustrates the bending stability of PAM based polymer electrolyte ZIBs of embodiments of the present invention.
Figure 8D:
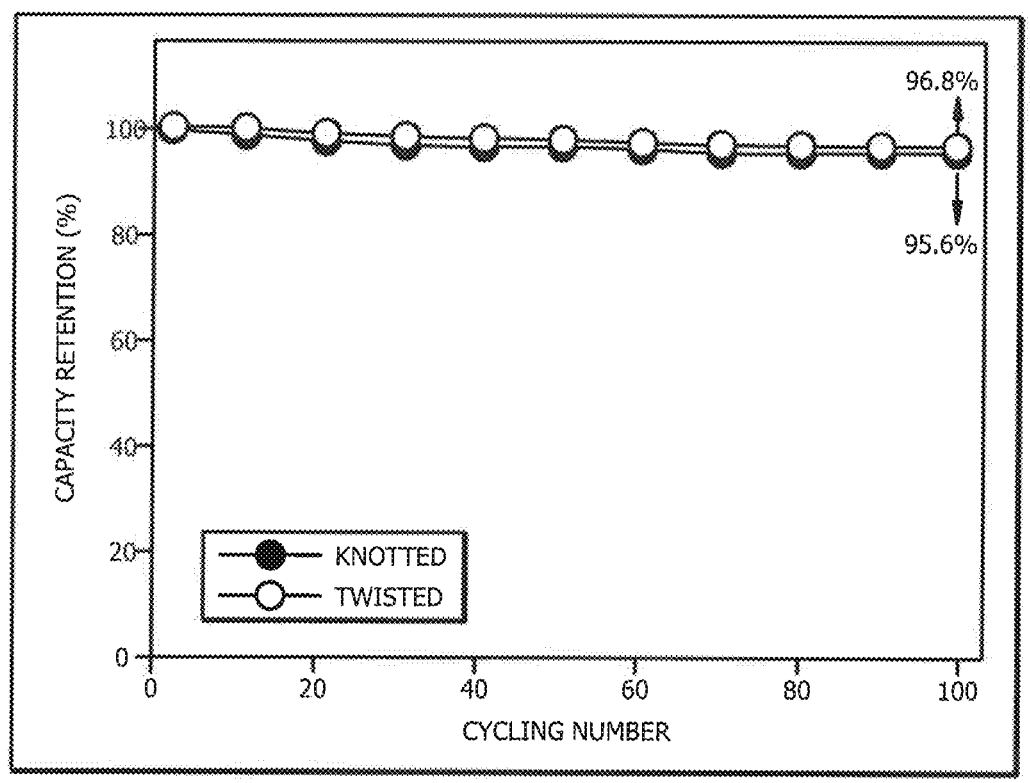
FIG. 8D shows the cycling test results under knotted and twisted conditions of an exemplary solid-state yarn configuration of PAM based polymer electrolyte ZIB of embodiments of the present invention.
Figure 8E:
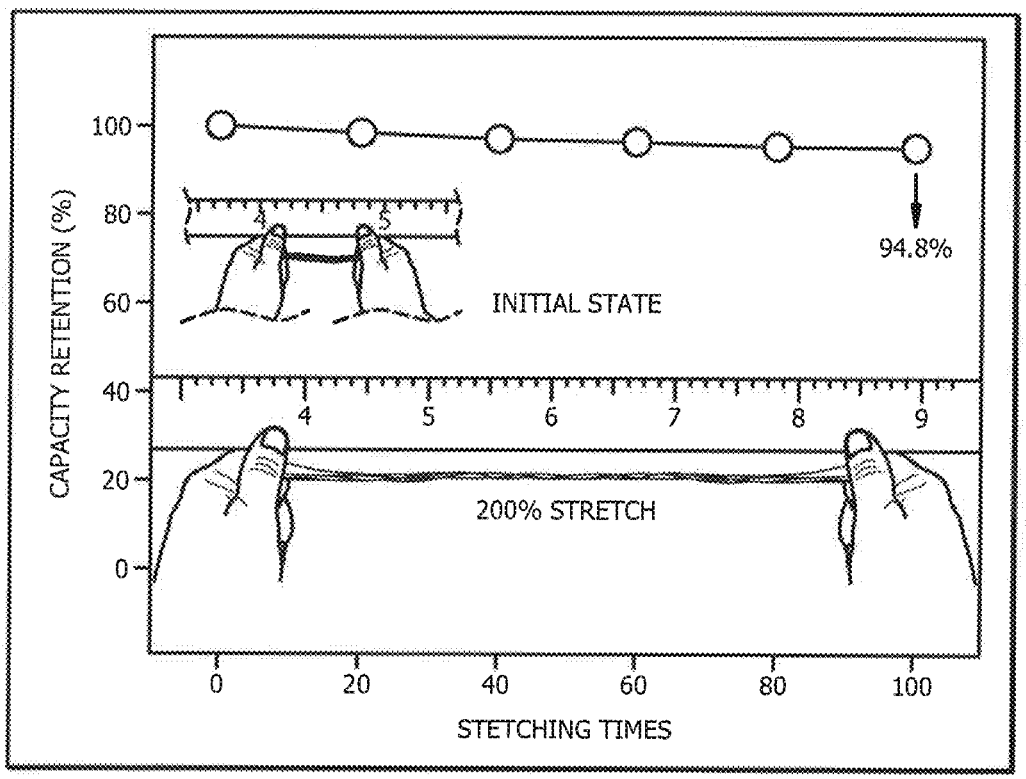
FIG. 8E illustrates the specific capacity retention of an exemplary solid-state yarn configuration of PAM based polymer electrolyte ZIB of embodiments of the present invention.

The bending stability of embodiments of PAM based polymer electrolyte ZIBs was tested by bending an exemplary solid-state yarn configuration of PAM based polymer electrolyte ZIB for 300 times using a specially designed stepper motor. As shown in FIG. 8C, there is only a slight change in the discharge curves of the solid-state yarn configuration of PAM based polymer electrolyte ZIB under test, and over 93.6% capacity was retained after 300 continuous bending cycles. FIG. 8D shows the cycling test results under knotted and twisted conditions of the exemplary solid-state yarn configuration of PAM based polymer electrolyte ZIB. It can be seen from the results represented in FIG. 8D that the solid-state yarn configuration of PAM based polymer electrolyte ZIB under test retains over 95.6% and 96.8% of the initial discharge capacity after charging and discharging for 100 times under knotting and twisting statuses, respectively. FIG. 8E shows that specific capacity retention of the exemplary solid-state yarn configuration of PAM based polymer electrolyte ZIB is nearly 95% after cycling 100 times when applied a strain of 200%.

Figure 9A:
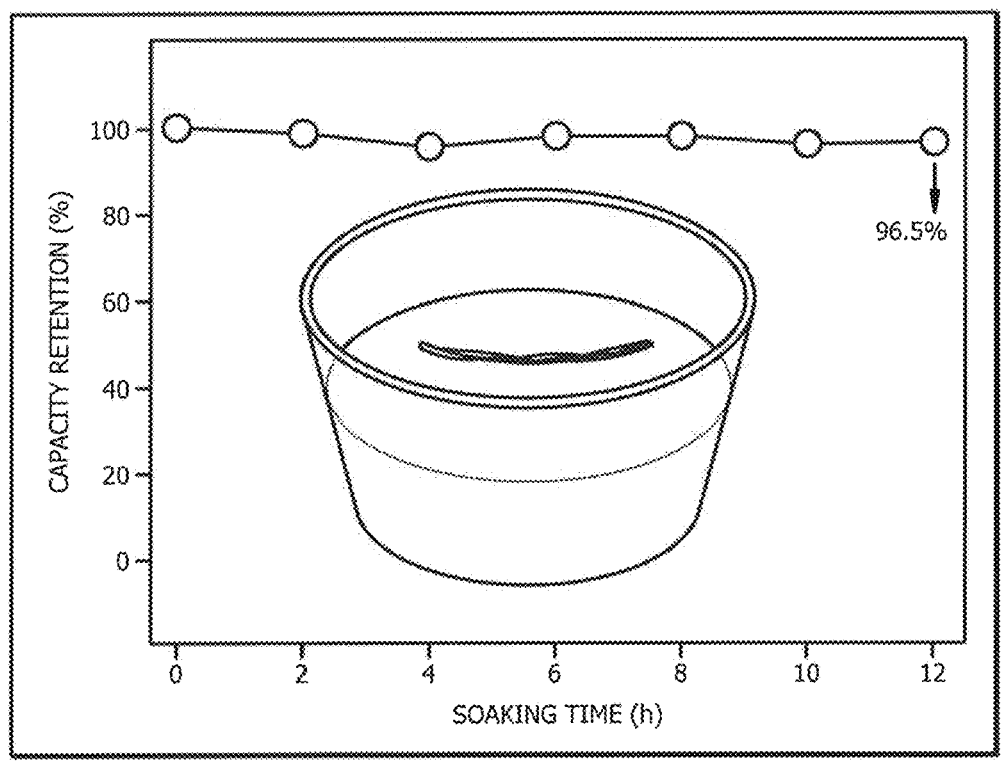
FIGS. 9A and 9B illustrate the waterproof ability and high durability of PAM based polymer electrolyte ZIBs of embodiments of the present invention.
Figure 9B:
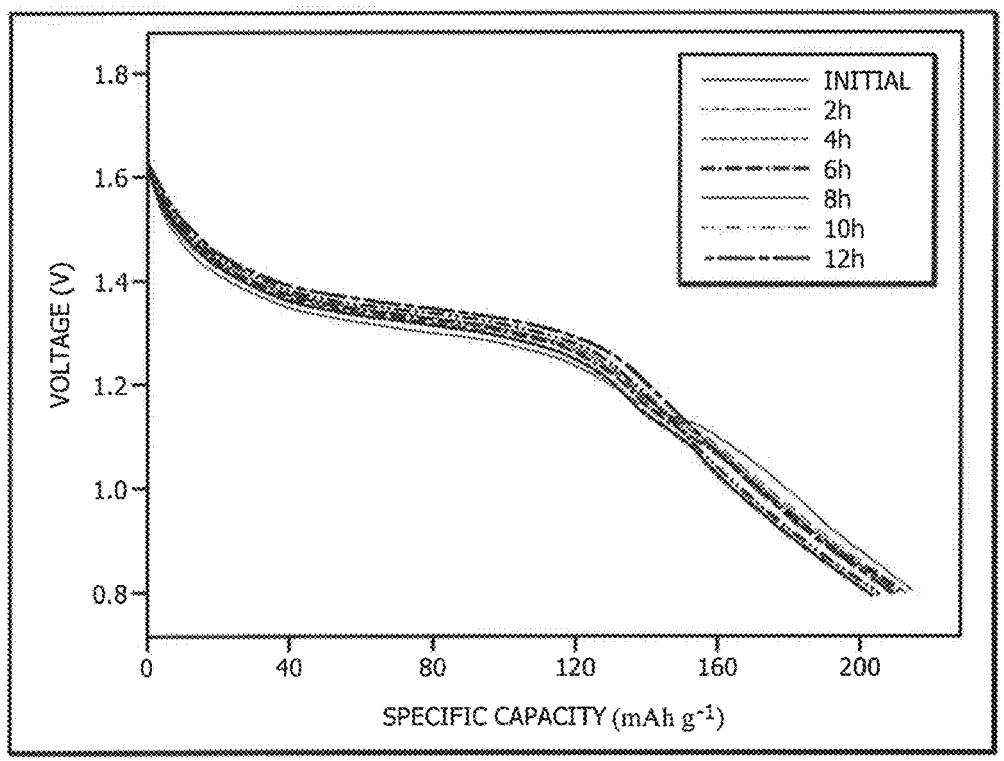

The foregoing demonstrates the robustness, excellent stability, and superior elasticity under various deformation conditions of PAM based polymer electrolyte ZIBs produced in accordance with the concepts of the present invention. Such characteristics are of great importance for the practical applications in flexible and wearable devices. Moreover, when integrated with electronics or textiles, a PAM based polymer electrolyte ZIB of embodiments may occasionally get wet by the rain or splashes of water during the daily use. Therefore, the waterproofness of such an energy storage device is also of importance for practical applications. Unlike traditional packaging, a PAM based polymer electrolyte ZIB of embodiments (e.g., configurations encapsulated with thin layer of a resilient membrane and/or water repellent can achieve superior waterproof performance while maintaining a high stretchability and flexibility. For example, an exemplary solid-state yarn configuration of PAM based polymer electrolyte ZIB maintained capacity retention of 96.5% after fully immersing in water for 12 hours, as shown in FIGS. 9A and 9B, demonstrating good waterproof ability and high durability. For example, for the discharge curves of FIG. 9B, the solid-state yarn configuration of PAM based polymer electrolyte ZIB under test was fully immersed in water with charge/discharge tests performed every two hours, wherein the discharge curves show only slight change during the long-time soaking process.

A further advantage of embodiments of a PAM based polymer electrolyte ZIB is its good tailor ability and weavability. For example, unlike conventional coin, column, or square-shaped energy storage devices, a solid-state yarn configuration of PAM based polymer electrolyte ZIB can be cut to any desired length to meet the demand of high-level integration, catering to versatile applications ranging from cloth, to smart glasses, smart watches and flexible displays. As a demonstration of the foregoing, a 1.1-meter long solid-state yarn configuration of PAM based polymer electrolyte ZIB, fabricated by the facile roll-dipping and roll-electrodeposition process described above, was cut into two parts. Each of the resulting two parts were found to be capable of powering a digital watch. Moreover, even when the resulting two solid-state yarn configuration of PAM based polymer electrolyte ZIBs were further cut to provide a total of eight parts, each of the resulting eight parts were found to be capable of powering the digital watch, showing high reliability. When these eight segmented solid-state yarn configuration of PAM based polymer electrolyte ZIBs were woven into a battery textile, they were found capable of powering a 1-meter long LED belt consisting of 100 lamp beads or a 100 cm$^2$ flexible electroluminescent panel via a small booster. These unique features indicate that a solid-state yarn configuration of PAM based polymer electrolyte ZIB can serve as a powerful and reliable energy storage device for more practical applications in other fields, including sensors, implantable medical devices, robotics, etc.

As can be appreciated from the foregoing, high-performance waterproof and stretchable PAM based polymer electrolyte ZIBs are provided according to embodiments of the present invention. In accordance with embodiments of such PAM based polymer electrolyte ZIBs, a PAM hydrogel electrolyte not only acts an effective separator but also serves as a good ionic conductor. The PAM based polymer electrolyte ZIBs of embodiments deliver a high specific energy density and volumetric energy density as well as excellent cycling stability. Moreover, embodiments of PAM based polymer electrolyte ZIBs demonstrate superior tailorability, good knitability, high stretchability, and excellent waterproof performance. With excellent mechanical and electrical properties, PAM based polymer electrolyte ZIBs embodiments can maintain their structural integrity and good electrical conductivity after being bent, twisted, or knotted for several times. Such characteristics enable PAM based polymer electrolyte ZIBs to open new opportunities and new applications to move beyond the limits of traditional energy storage devices (e.g., lithium ion batteries), such as for flexible and wearable technologies. For example, PAM based polymer electrolyte ZIBs of embodiments of the present invention may be used as a low cost, highly durable and flexible energy storage devices to power portable or flexible electronic devices such as wearable electronics, flexible displays, digital memory, flexible sensors, active radio-frequency identification tags (RFIT), implantable medical devices and intelligent clothing. Moreover, PAM based polymer electrolyte ZIB technology in accordance with the concepts herein may be used in other fields, such as transportation, military, robotics, sport, medical diagnostics, etc.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for providing a flexible zinc-ion battery, the method comprising:
    obtaining a crosslinked polyacrylamide (PAM) based polymer electrolyte comprising a polyelectrolyte matrix hosting a solution of zinc sulfate and manganese sulfate to form a hydrogel electrolyte, wherein the crosslinked PAM based polymer electrolyte is configured to provide a porous three-dimensional (3D) polymer matrix network providing water retention and free movement of zinc ions of the solution of zinc sulfate and manganese sulfate facilitating ionic conductivity; and
    disposing the crosslinked PAM based polymer electrolyte between a flexible cathode and a flexible anode to form the flexible zinc-ion battery, wherein the flexible cathode comprises a carbon nanotube (CNT) substrate coated with a manganese dioxide material, wherein the flexible anode comprises a CNT substrate coated with a zinc material, wherein the disposing the crosslinked PAM based polymer electrolyte between the flexible cathode and the flexible anode comprises:
        encapsulating the flexible cathode and the flexible anode with the PAM based polymer electrolyte, wherein the CNT substrates of the cathode and anode comprise multiple helix yarn electrodes disposed in a double helix encapsulated by the crosslinked PAM based polymer electrolyte to provide a yarn zinc-ion battery configuration.

2. The method of claim 1, wherein an ionic conductivity of the crosslinked PAM based polymer electrolyte is 17.3× $10^{-3}$ S cm$^{-1}$ at room temperature.

3. The method of claim 1, wherein the obtaining the crosslinked PAM based polymer electrolyte comprises:
    introducing the solution of zinc sulfate and manganese sulfate to a PAM based polymer.

4. The method of claim 1, further comprising:
    encapsulating the flexible zinc-ion battery with a resilient membrane.

5. The method of claim 4, wherein the resilient membrane is water resistant.

6. A zinc-ion battery comprising:
    a cathode, wherein the cathode is flexible, and wherein the flexible cathode comprises a carbon nanotube (CNT) substrate coated with a manganese dioxide material;

an anode, wherein the anode is flexible, and wherein the flexible anode comprises a CNT substrate coated with a zinc material; and a crosslinked polyacrylamide (PAM) based polymer electrolyte comprising a polyelectrolyte matrix hosting a solution of zinc sulfate and manganese sulfate to form a hydrogel electrolyte, wherein the crosslinked PAM based polymer electrolyte is configured to provide a porous three-dimensional (3D) polymer matrix network providing water retention and free movement of zinc ions of the solution of zinc sulfate and manganese sulfate facilitating ionic conductivity, and wherein the CNT substrates of the cathode and anode comprise multiple helix yarn electrodes disposed in a double helix encapsulated by the crosslinked PAM based polymer electrolyte to provide a yarn zinc-ion battery configuration.

7. The zinc-ion battery of claim 6, wherein an ionic conductivity of the crosslinked PAM based polymer electrolyte is $17.3 \times 10^{-3}$ S cm$^{-1}$ at room temperature.

8. The zinc-ion battery of claim 6, wherein the crosslinked PAM based polymer electrolyte is configured to serve as a separator to maintain separation of the cathode and the anode.

9. The zinc-ion battery of claim 6, wherein the zinc-ion battery is flexible and rechargeable.

10. A flexible and rechargeable zinc-ion battery comprising:

a flexible cathode including a manganese dioxide material, wherein the flexible cathode comprises a carbon nanotube (CNT) substrate coated with the manganese dioxide material;

a flexible anode including a zinc material, wherein the flexible anode comprises a CNT substrate coated with the zinc material;

a crosslinked polyacrylamide (PAM) based polymer electrolyte including a crosslinked polyacrylamide hydrogel formed from a polyelectrolyte matrix hosting a solution of zinc sulfate and manganese sulfate, wherein the crosslinked PAM based polymer electrolyte is configured to provide a porous three-dimensional (3D) polymer matrix network providing water retention and free movement of zinc ions of the solution of zinc sulfate and manganese sulfate facilitating ionic conductivity; and a resilient membrane encapsulating the flexible cathode, the flexible anode, and the crosslinked PAM based polymer to form the flexible and rechargeable zinc-ion battery, wherein the CNT substrates of the cathode and anode comprise multiple helix yarn electrodes disposed in a double helix encapsulated by the crosslinked PAM based polymer electrolyte to provide a yarn zinc-ion battery configuration.

11. The flexible and rechargeable zinc-ion battery of claim 10, wherein the crosslinked PAM based polymer electrolyte is configured to serve as a separator to maintain separation of the flexible cathode and the flexible anode.

* * * * *

UNITED STATES PATENT AND TRADEMARK OFFICE
CERTIFICATE OF CORRECTION

PATENT NO. : 10,957,939 B2
APPLICATION NO. : 15/805779
DATED : March 23, 2021
INVENTOR(S) : Chunyi Zhi et al.

It is certified that error appears in the above-identified patent and that said Letters Patent is hereby corrected as shown below:

In the Specification

At Column 1, Line number 37, delete "fiber yarn based" and replace with --fiber or yarn-based--.
At Column 2, Line number 10, delete "nanottibes" and replace with --nanotubes--.
At Column 2, Line number 33, delete "$\delta\text{-}MnO_2$" and replace with --$\gamma\text{-}MnO_2$--.
At Column 3, Line number 55, delete "ftom" and replace with --from--.
At Column 7, Line number 53, delete "3E" and replace with --3B--.
At Column 9, Line number 64, delete "$17.3 \times 10^{-3}\ S^{-1}$" and replace with --$17.3 \times 10^{-3}\ S\ cm^{-1}$--.
At Column 10, Line number 28, delete "135 V" and replace with --1.75 V--.
At Column 13, Line number 52, delete "ZIBs embodiments" and replace with --ZIBs of embodiments--.

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*